United States Patent [19]
Steiner

[11] Patent Number: 5,604,971
[45] Date of Patent: Feb. 25, 1997

[54] MANUFACTURING METHOD FOR VARIABLE LAMINATIONS USED IN ELECTRO-MAGNETIC INDUCTION DEVICES

[76] Inventor: Robert E. Steiner, 1760 Horseshoe Ridge, Chesterfield, Mo. 63005

[21] Appl. No.: 267,392

[22] Filed: Aug. 12, 1994

Related U.S. Application Data

[63] Continuation-in-part of Ser. No. 129,336, Sep. 30, 1993, Ser. No. 172,822, Dec. 27, 1993, Ser. No. 173,095, Dec. 27, 1993, Ser. No. 197,255, Feb. 16, 1994, abandoned, and Ser. No. 199,600, Feb. 22, 1994.

[51] Int. Cl.$^6$ ............................................. H02K 15/04
[52] U.S. Cl. .............................. 29/596; 29/598; 29/609; 310/42; 310/216
[58] Field of Search .......................... 29/596, 598, 609, 29/605, 606; 336/208, 234; 242/4 R, 4 B, 4 A; 310/216–218, 42

[56] References Cited

U.S. PATENT DOCUMENTS

| | | |
|---|---|---|
| 641,538 | 1/1900 | Pavon . |
| 708,220 | 9/1902 | Gill . |
| 714,891 | 12/1902 | Gill . |
| 905,817 | 12/1908 | Howell . |
| 1,952,917 | 3/1934 | Granfield ................................. 29/84 |
| 2,534,312 | 12/1950 | Somerville .............................. 175/356 |
| 2,550,500 | 4/1951 | Schell, Jr. ............................... 175/356 |
| 2,702,375 | 2/1955 | Johnson .................................. 336/210 |
| 2,849,696 | 8/1958 | Moynihan ............................... 336/212 |
| 2,942,511 | 6/1960 | Moynihan ................................. 83/29 |
| 3,360,752 | 12/1967 | Uptegraff, Jr. ........................... 336/59 |
| 3,422,293 | 1/1969 | Booth .................................... 310/16 |
| 3,448,340 | 6/1969 | Lewis .................................... 317/14 |
| 3,458,928 | 8/1969 | Crawford et al. ....................... 29/605 |
| 3,613,229 | 10/1971 | Olsen et al. ............................ 29/605 |
| 3,721,400 | 3/1973 | Weisman ............................... 242/118 |
| 3,750,070 | 7/1973 | Rissinger ............................... 336/84 |
| 3,792,399 | 2/1974 | McLyman .............................. 336/210 |
| 3,810,058 | 5/1974 | White et al. ........................... 336/196 |
| 3,956,651 | 5/1976 | Brammerio ............................. 310/218 |
| 3,983,433 | 9/1976 | Sims ...................................... 310/254 |
| 4,321,572 | 3/1982 | Studor et al. ........................... 336/83 |
| 4,557,039 | 12/1985 | Manderson ............................. 29/605 |

(List continued on next page.)

FOREIGN PATENT DOCUMENTS 72316 of 1970 German Dem. Rep. .
196048 4/1923 United Kingdom .

*Primary Examiner*—Carl E. Hall
*Attorney, Agent, or Firm*—Polster, Lieder, Woodruff & Lucchesi, L.C.

[57] ABSTRACT

A method and apparatus for forming and stacking laminations that are used in an electro-magnetic device such as a motor or transformer is disclosed. The method steps and apparatus used provides the incremental forming of a predetermined number of laminations from magnetically conductive material with each lamination having at least one coil winding segment of predetermined incrementally varying width. Each coil winding segment is formed by the movement of forming elements such as punching or stamping dies or laser devices and the magnetically conductive material relative to one another. Following formation of the laminations with the aforementioned coil winding segments of predetermined incrementally varying width, the laminations, with the formed coil winding segments, are stacked to provide a combined generally circular outer cross sectional winding area about which a predetermined length of conductive wire can be positioned, either directly around the cross sectional winding area about a bobbin wound with the electrically conductive wire, or about a split bobbin first assembled over the winding area and then subsequently wound with electrically conductive wire. When the forming elements are moved relative to the magnetically conductive material, the forming elements can be moved in any direction in any predetermined linear and/or curvilinear path, depending on the laminations produced. For the manufacture of certain electro-magnetic devices, in lieu of moving the forming elements relative to the magnetically conductive material, the magnetically conductive material can be moved relative to the forming elements.

15 Claims, 21 Drawing Sheets

U.S. PATENT DOCUMENTS

| | | | |
|---|---|---|---|
| 4,560,970 | 12/1985 | Lenzing | 336/149 |
| 4,600,911 | 7/1986 | Meinert | 336/212 |
| 4,641,119 | 2/1987 | Moore | 335/297 |
| 4,653,178 | 3/1987 | Graul | 29/605 |
| 4,745,675 | 5/1988 | Marks et al. | 29/396 |
| 4,752,999 | 6/1988 | Sills, Jr. | 29/605 |
| 4,763,848 | 8/1988 | Bernhard | 242/1 |
| 4,924,200 | 5/1990 | Kitahara et al. | 336/65 |

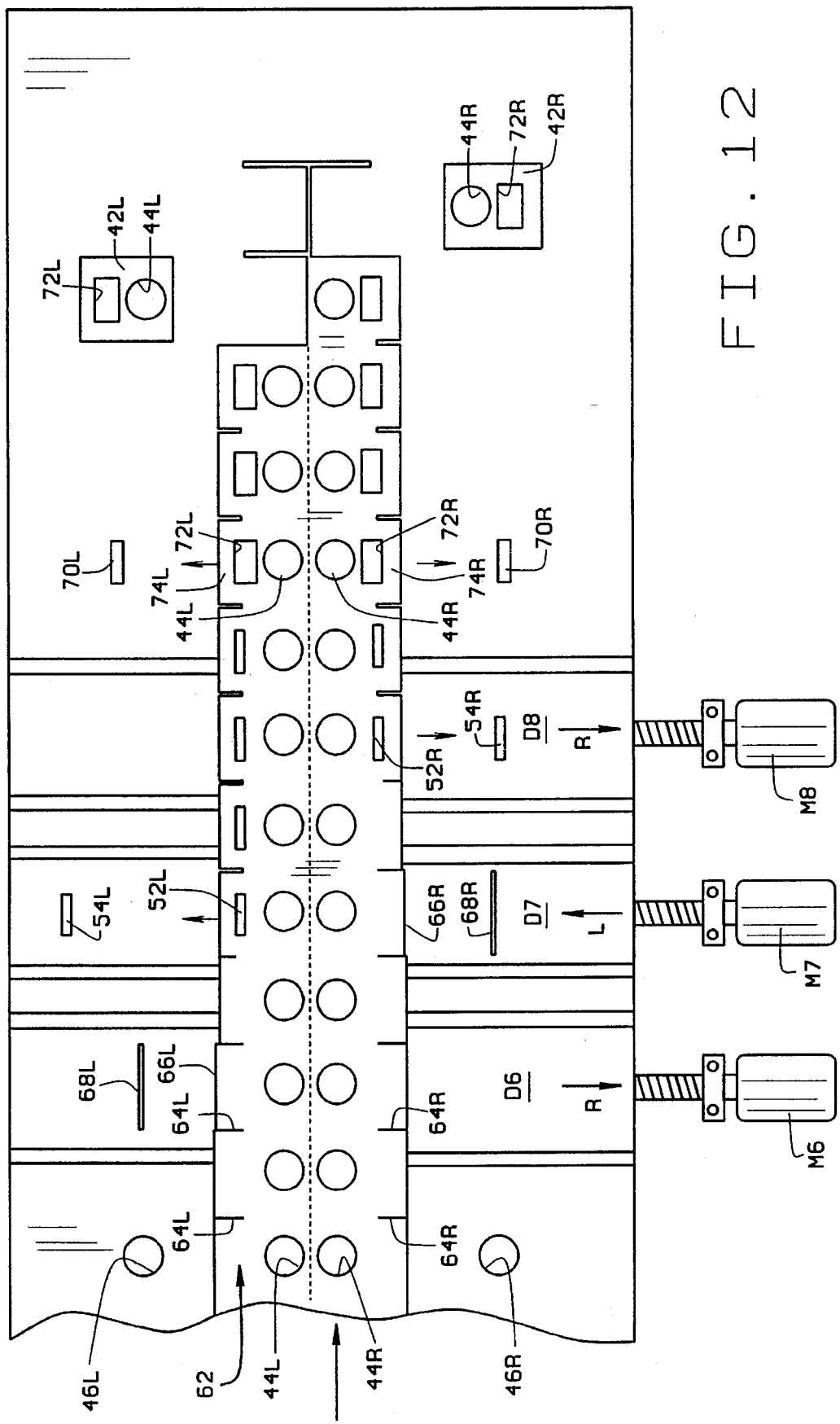

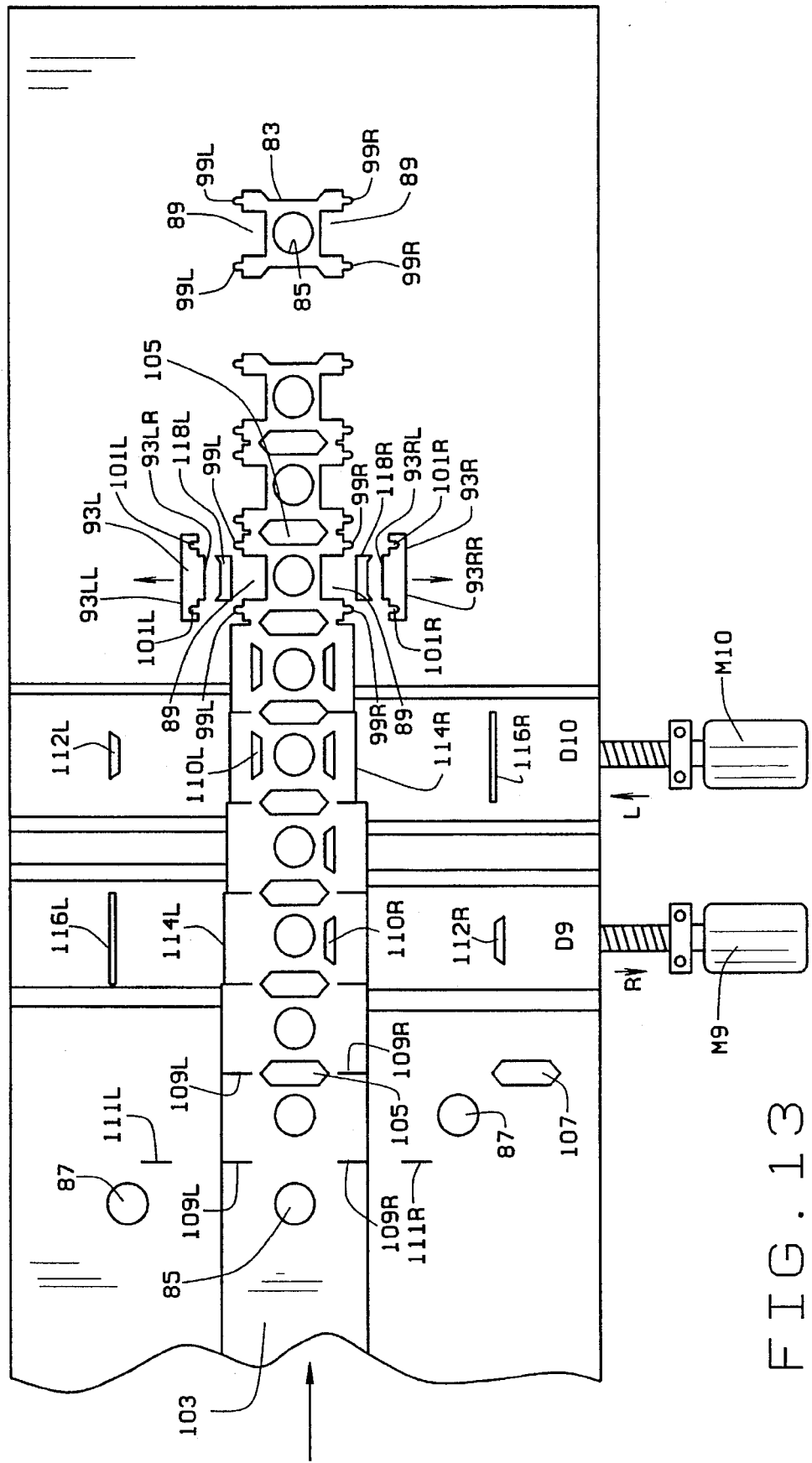

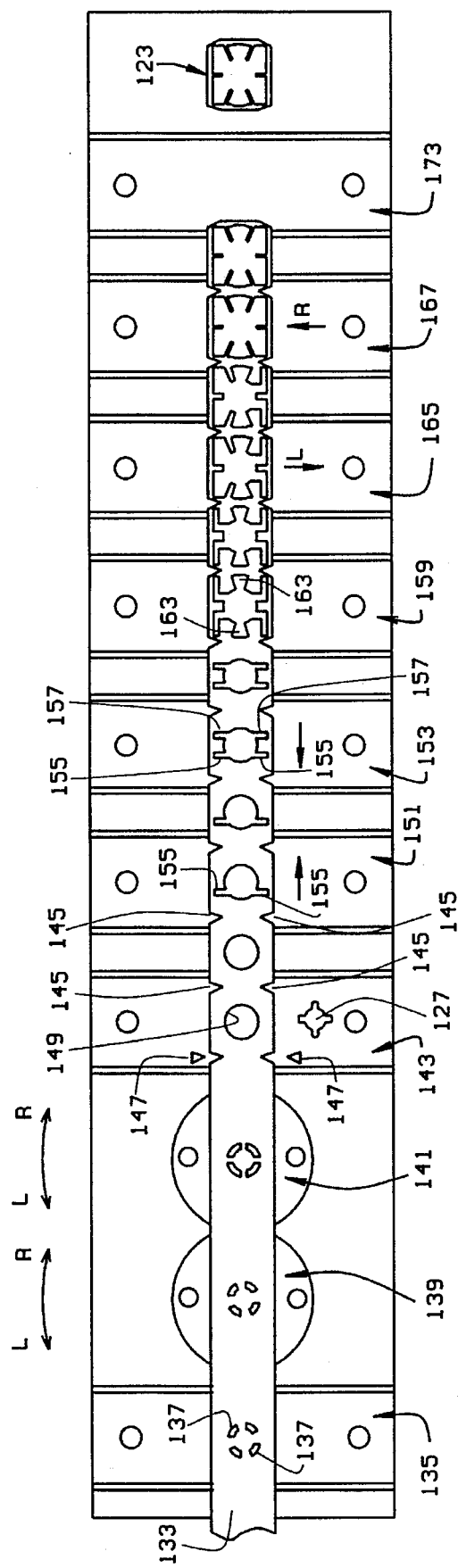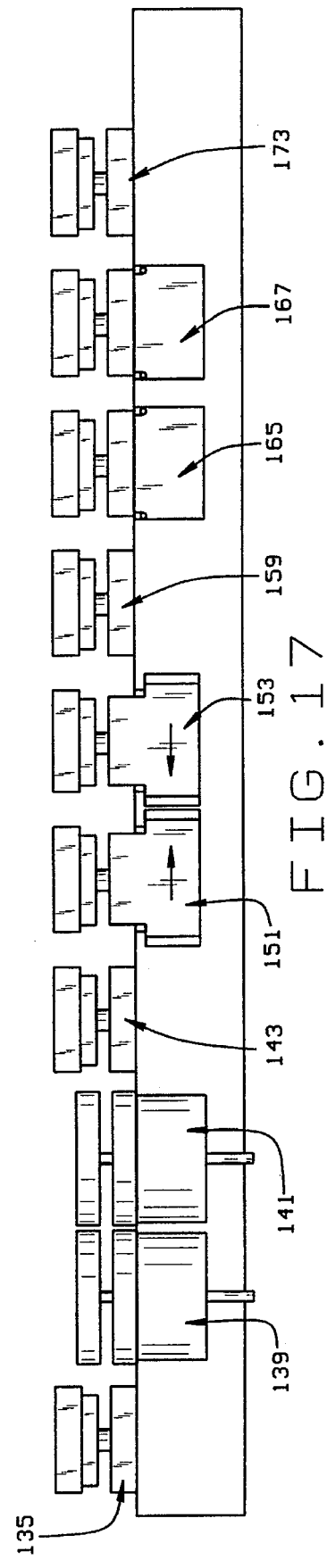
FIG. 16
FIG. 17

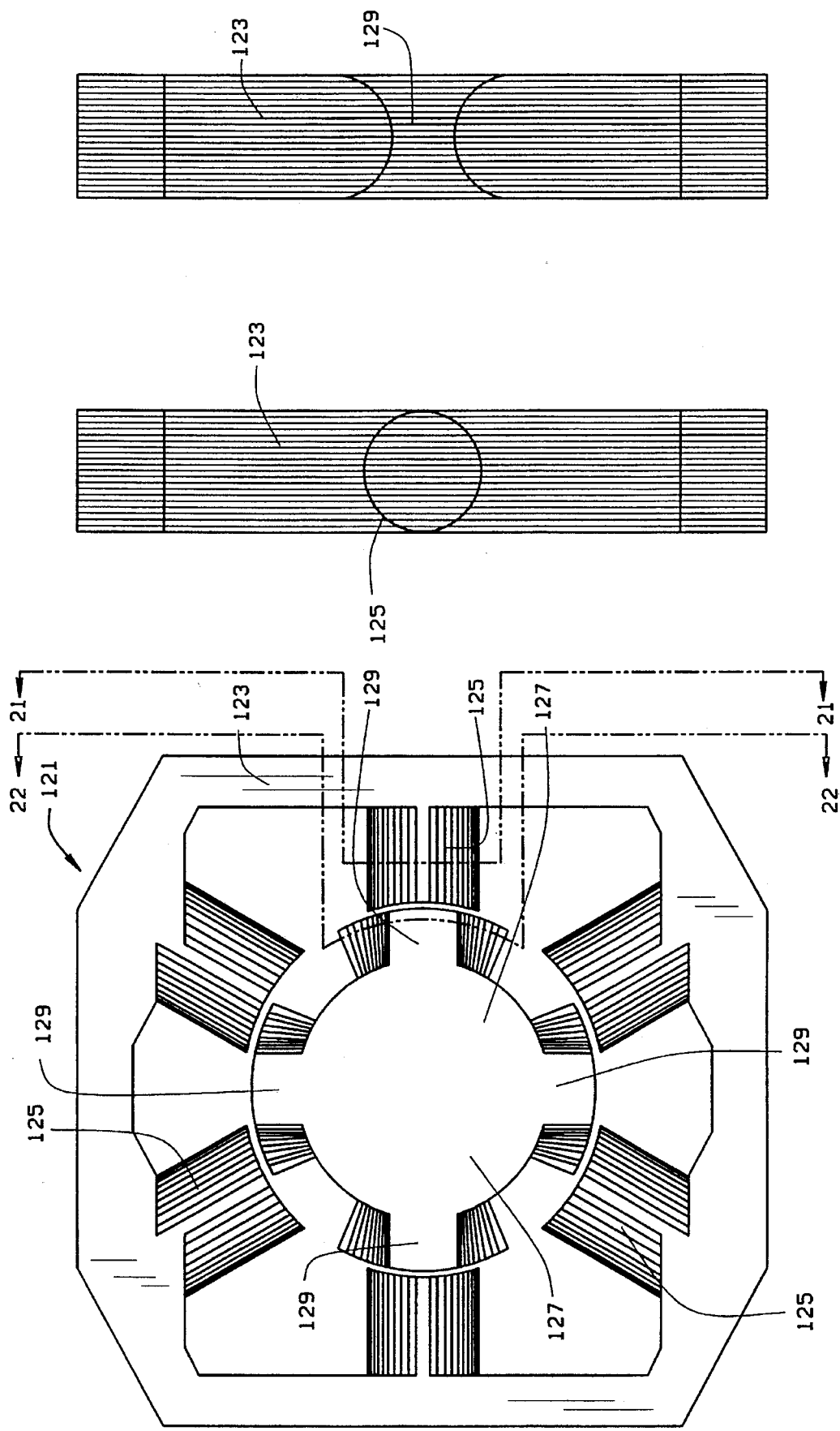

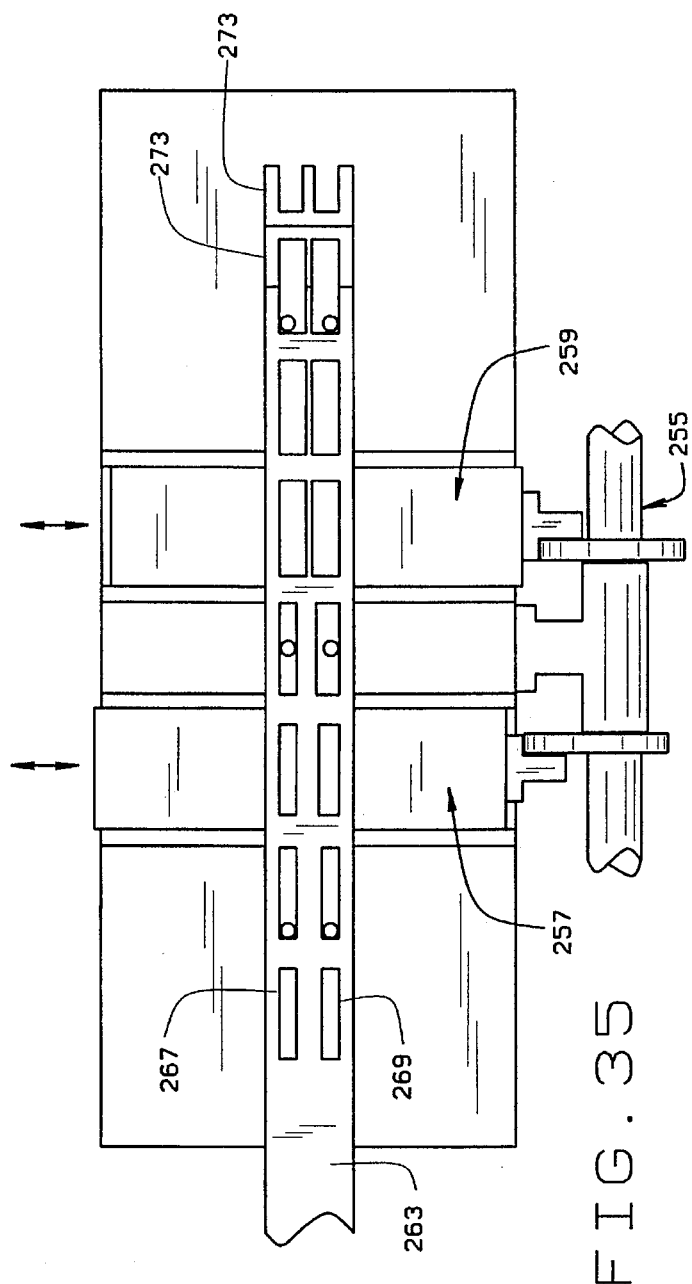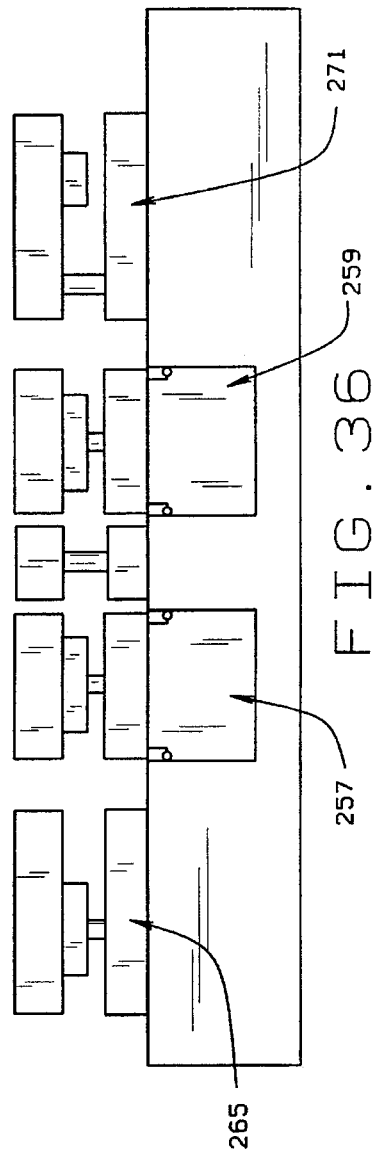

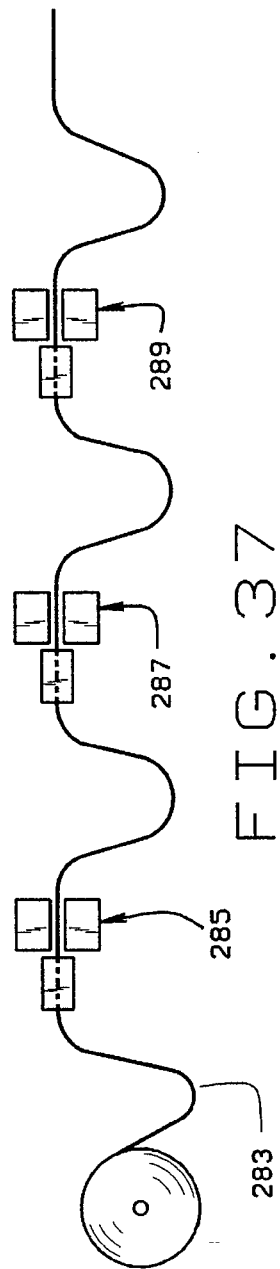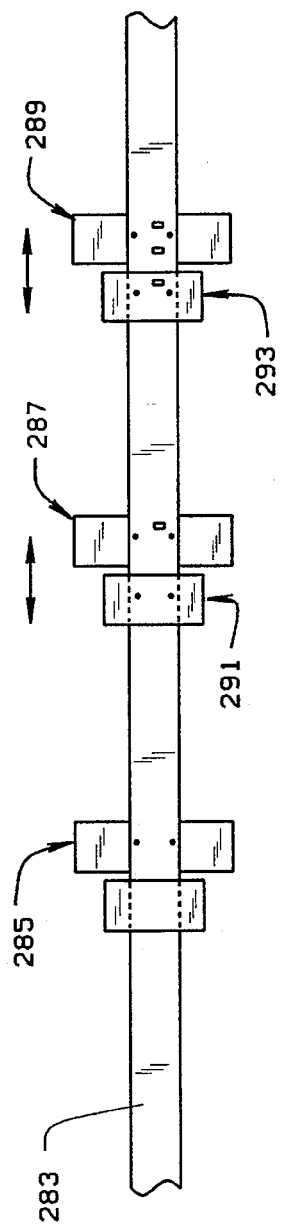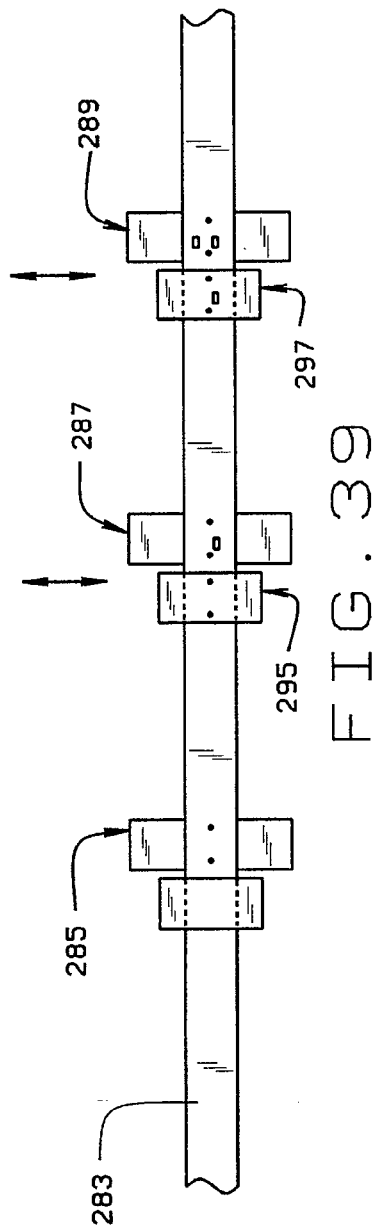

MANUFACTURING METHOD FOR VARIABLE LAMINATIONS USED IN ELECTRO-MAGNETIC INDUCTION DEVICES

CROSS REFERENCE TO RELATED APPLICATIONS

This application is a continuation-in-part of the following copending patent applications: Ser. No. 08/129,336 filed Sep. 30, 1993 entitled METHOD FOR MANUFACTURING IMPROVED ELECTRO-MAGNETIC INDUCTION DEVICES Ser. No. 08/172,822 filed Dec. 27, 1993 entitled LOW COST UNIVERSAL/SHADED POLE/PERMANENT MAGNET MOTORS Ser. No. 08/173,095 filed Dec. 27, 1993 entitled VARIABLE RELUCTANCE MOTOR, Ser. No. 08/197,255 filed Feb. 16, 1994 entitled LOW COST TRANSFORMER/INDUCTOR AND METHOD OF MANUFACTURE, now abandoned; and Ser. No. 08/199,600 filed Feb. 22, 1994 entitled LOW COST C-FRAME MOTORS AND METHODS OF MANUFACTURE.

Background of the Invention

The present invention relates to a manufacturing method and apparatus for variable laminations used in electro-magnetic induction devices such as motors or transformers, and more particularly, to a method of forming and stacking laminations used in such electro-magnetic induction devices, in order to substantially reduce the amount of material used in the manufacture of such devices.

As disclosed in my aforementioned copending patent applications, I have discovered that it is possible to selectively form at least one predetermined area of stacked laminations forming a magnetic inductor circuit with a generally circular outer cross sectional shape at least along opposed spaced sections thereof, in order that an electrically conductive wire can be wound or positioned about such area with substantially less material than is possible with typical square or rectangular cross sectional coil winding areas presently in use. In addition to reducing the amount of electrically conductive wire used, the aforementioned generally circular outer cross sectional shape also enables the electrically conductive wire to be layer wound in closely packed relationship in a plurality of superimposed rows, thus providing a close fitting and efficiently wound electrically conductive coil. Thus, not only does the electrically conductive wire forming the electrically conductive coil use substantially less material, but in certain instances, the amount of material required for the laminations in the magnetic inductor circuit can also be reduced. As a result, substantial material savings in motors, transformers and other inductive devices can be achieved.

While my aforementioned copending patent applications have generally disclosed the improved method and apparatus for forming and stacking laminations constructed as discussed above, the specific details of the method and apparatus used in the manufacture of laminations from coil stock and other forms of magnetically conductive material have not been disclosed until this present application. As will be seen from the discussion that follows, the novel and unique method and apparatus for forming variable laminations from magnetically conductive material so as to permit such stacking of laminations in preferred arrangements for use in electro-magnetic induction devices will be disclosed in detail.

SUMMARY OF THE INVENTION

Among the several objects and advantages of the present invention include:

The provision of anew and improved method and apparatus for forming variable laminations in manufacturing electro-magnetic induction devices;

The provision of the aforementioned new and improved method and apparatus for manufacturing a variety of different types and kinds of electro-magnetic induction devices, all of which substantially reduce the amount of material required for the electrically conductive coil used in such devices, and in certain instances, material savings can be achieved in the magnetic inductor circuit and in other components associated with the electro-magnetic induction device;

The provision of the aforementioned new and improved method and apparatus in which predetermined incrementally varying widths used in coil winding segments are formed by moving forming elements such as punching or stamping dies, laser, hydro-jet or other cutting devices, relative to magnetically conductive material for incrementally punching the laminations in the desired construction;

The provision of the aforementioned new and improved method and apparatus in which the forming elements can be moved relative to the elongated strip in any direction in predetermined linear and/or curvilinear paths, depending on the laminations desired to be produced;

The provision of the aforementioned new and improved method and apparatus in which the magnetically conductive material can be moved in a desired predetermined path relative to the forming elements, if desired;

The provision of the aforementioned new and improved method and apparatus in which simple procedural steps or apparatus are employed for achieving substantial cost reduction in motor and transformer manufacture;

The provision of the aforementioned new and improved method and apparatus which is capable of continuous operation and automation in the forming and stacking of the variable laminations; and The provision of the aforementioned new and improved method and apparatus which are readily adaptable to current manufacturing techniques, as well as current electro-magnetic induction device construction, without requiring substantial modifications or changes.

Briefly stated, the method or apparatus for forming and stacking laminations used in an electro-magnetic induction device includes the steps or corresponding structure for incrementally forming a predetermined number of laminations from magnetically conductive material each having a coil winding segment of predetermined incrementally varying width. Each coil winding segment of predetermined incrementally varying width is formed by the movement of the forming elements and magnetically conductive material relative to one another. Subsequently, the laminations are stacked with the coil winding segments of the laminations arranged to form a combined generally circular outer cross sectional winding area about which a predetermined length of electrically conductive wire can be positioned. The electrically conductive wire can be directly wound on the coil winding area or wound about an associated bobbin that can be positioned about the winding area. Alternatively, split bobbins can be assembled over the winding area and then the electrically conductive coil can be wound about the assembled split bobbins.

In order to move the forming elements and magnetically conductive material relative to one another, the forming elements can be moved relative to the magnetically conductive material or vice versa. When the forming elements are moved relative to the magnetically conductive material, the forming elements can be moved in any direction in any predetermined linear and/or curvilinear path relative to the magnetically conductive material, depending on the laminations to be produced. For example, the forming elements can be moved generally transversely relative to the magnetically conductive material or generally longitudinally relative to the magnetically conductive material or moved in predetermined curvilinear including rotary paths relative to the magnetically conductive material. In some instances, a combination of some or all of the above movements are desirable in producing certain types of laminations.

Where the magnetically conductive material is moved in a desired predetermined path relative to the forming elements, the magnetically conductive material can be moved, for example, either generally transversely relative to the forming elements or generally longitudinally relative to the forming elements.

Whether the forming elements are moved relative to the magnetically conductive material or the magnetically conductive material is moved relative to the forming elements, such movement occurs between lamination forming stations.

For moving the forming elements relative to the magnetically conductive material, computer or electronically controlled drive motors or a press stroke indexed cam may be employed, for example, while computer or electronically controlled material feeding mechanisms and other suitable material feeding mechanisms may be employed in moving the magnetically conductive material relative to the forming elements. In the formation of certain laminations, such as used in C-frame motors and the like, C-frame laminations are formed from magnetically conductive material. At the same time, coil winding laminations for association with the C-frame laminations are also formed from the magnetically conductive material.

In the manufacture of laminations for such C-frame motors and the like, opposite edge portions of the C-frame laminations are formed with predetermined incrementally varying dimensions such that in the forming of predetermined incrementally varying width coil winding laminations, the opposite edge portions are used in forming the coil winding laminations of predetermined incrementally varying widths. The opposite edge portions can be formed by the sequential forming of the C-frame laminations during the progressive forming process. Complementary fastening elements on the C-frame laminations and coil winding laminations are also formed during the forming of the coil winding laminations and C-frame laminations. A U-shaped opening is also formed in the C-frame laminations adjacent the assembled position of the coil winding laminations to the C-frame laminations for receiving the electrical coil positioned about the combined coil winding area of stacked coil winding laminations. The U-shaped opening is formed in the C-shaped laminations either during the forming of the coil winding laminations or after the forming of the coil winding laminations.

In the forming of one type of multi-pole motor, progressively formed predetermined incrementally varying coil winding laminations can be formed from opposite end areas of stator laminations to provide two coil winding laminations each having predetermined incrementally varying width for forming predetermined combined coil winding areas of generally circular outer cross sectional configuration at least along opposed spaced sections thereof for receiving an electrical coil of corresponding shape. Subsequently, the stacked stator laminations and the spaced an stacked coil winding laminations can be assembled to one another.

A multi-pole rotor and stator motor can also be manufactured, where both the rotor and stator laminations are formed with corresponding poles of predetermined construction. The rotor laminations include outwardly directed spaced rotor pole side sections with predetermined incrementally varying width on opposite sides of an outwardly curved rotor pole face section which, when stacked together, form outwardly curved rotor pole faces in associated combined rotor pole side sections of predetermined incrementally varying width. The stator laminations are formed with a plurality of inwardly directed spaced stator pole side sections having predetermined incrementally varying widths on opposite sides of an inwardly curved stator pole face section such that when stacked, they form a combined inwardly curved stator pole face and associated combined stator pole side sections with a combined coil winding area of generally circular outer cross sectional shape at least along opposed spaced sections thereof.

Motors of the multi-pole rotor and stator type can be formed by forming elements moving in predetermined rotary paths, as well as forming elements moving in any direction including any predetermined linear and/or curvilinear path.

In forming certain motors, rotary forming elements that move in predetermined rotary paths relative to magnetically conductive material can also be used in incrementally forming a circumferential series of coil winding areas segments, each coil winding area or segment having predetermined incrementally varying widths similar to other coil winding areas or segments in the circumferential series. The laminations for each of the aforementioned coil winding areas or segments form a combined generally circular outer cross sectional winding area at least along opposed spaced sections thereof about which a predetermined length of electrically conductive wire can be positioned.

A variety of other and different types of motors, transformers and other induction devices, some of which are specifically illustrated, can be formed by the method and apparatus of the present invention.

These and other objects and advantages of the present invention will become apparent from the discussion that follows.

Figure 8A:
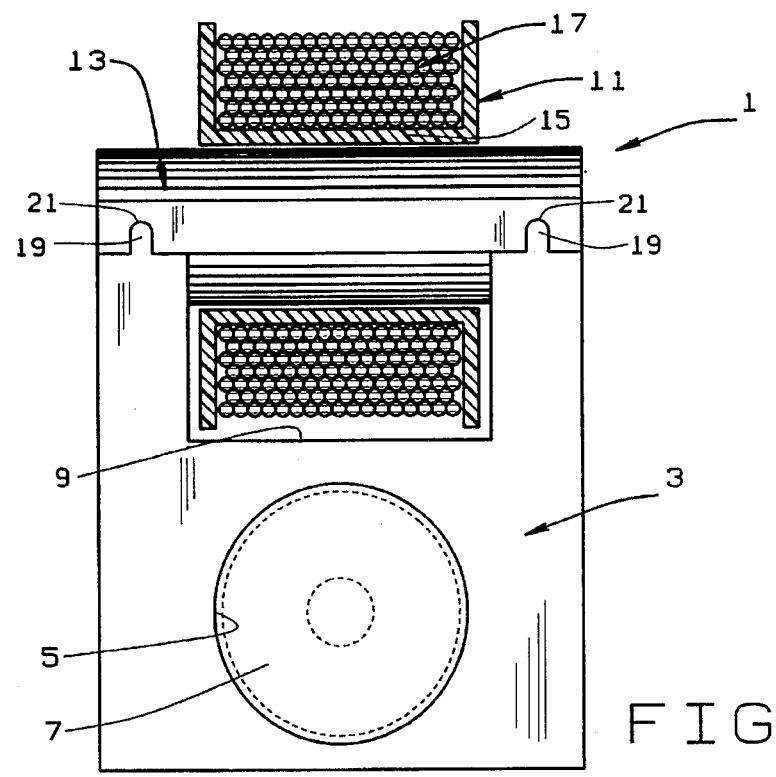
FIG. 8A is a side elevational view of a C-frame motor which includes stacked C-frame laminations and stacked coil winding laminations assembled to one another, after a bobbin wound with an electrically conductive coil is assembled over the stacked C-frame laminations.
Figures 8B, 8C, 8D:
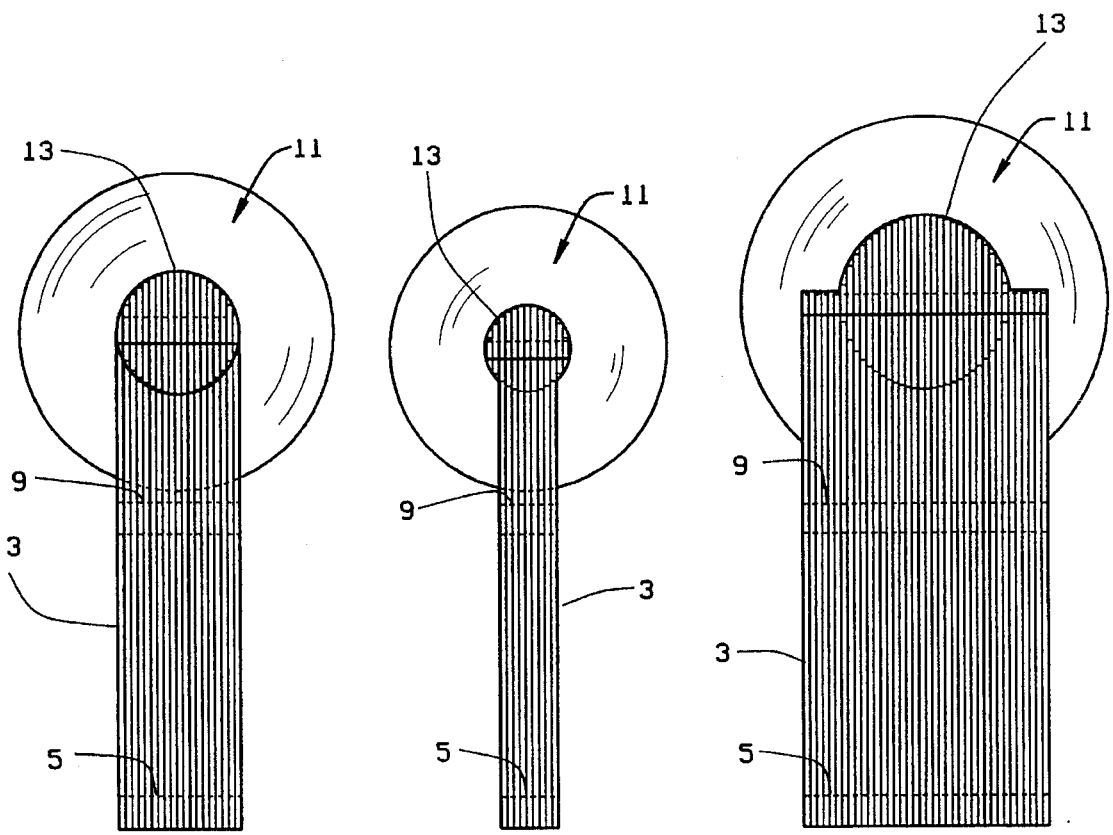
FIG. 8B is an end elevational view of a predetermined number of stacked laminations used in the construction of a particular horsepower size utilizing the C-frame motor construction illustrated in FIG. 8A of the drawings.
FIG. 8C is an end elevational view of a smaller stack height C-frame motor construction.
FIG. 8D is an end elevational view of a substantially greater stack height C-frame motor construction than either the FIG. 8B or 8C C-frame motors.
Figure 14:
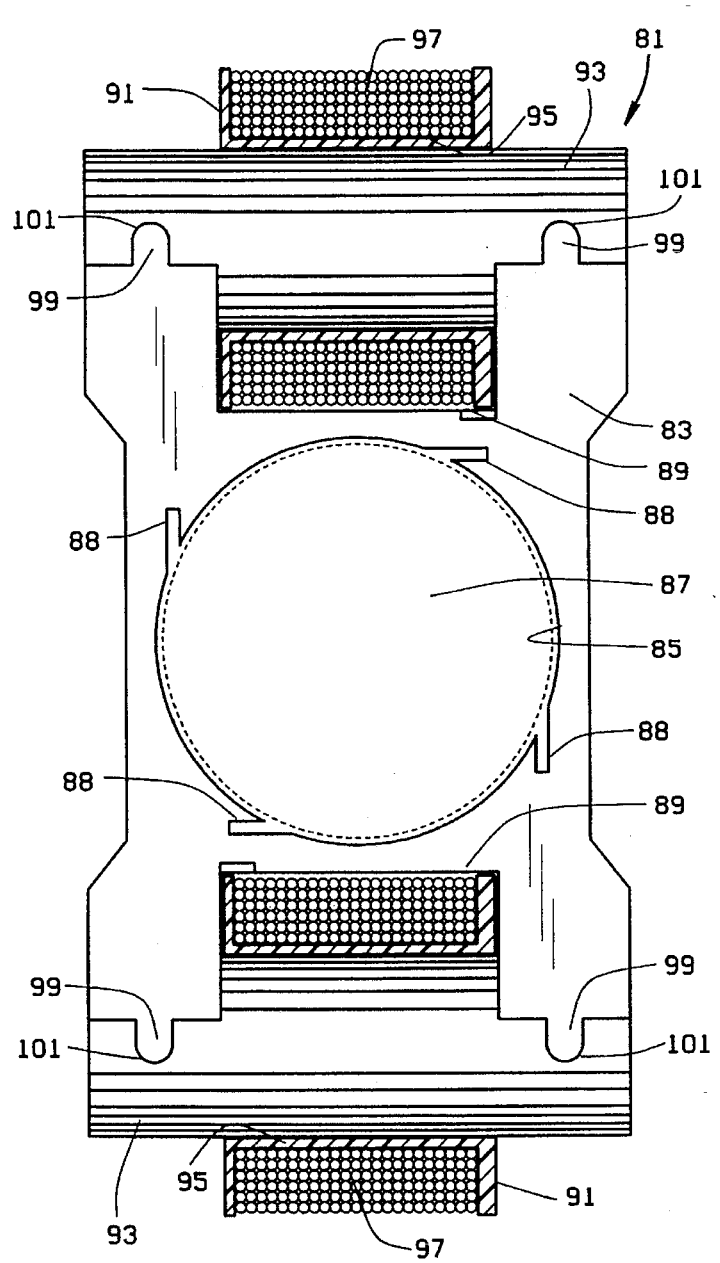
Figure 15:
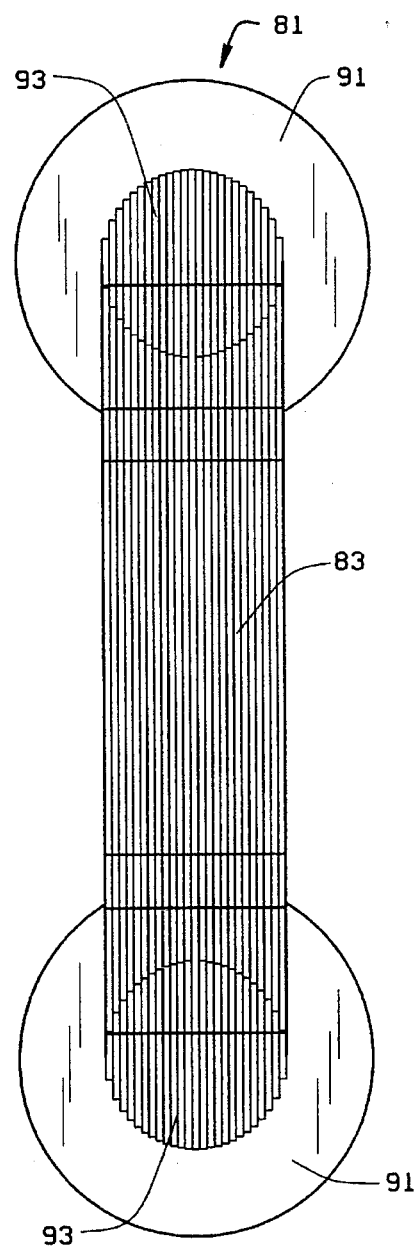
Figures 18, 19:
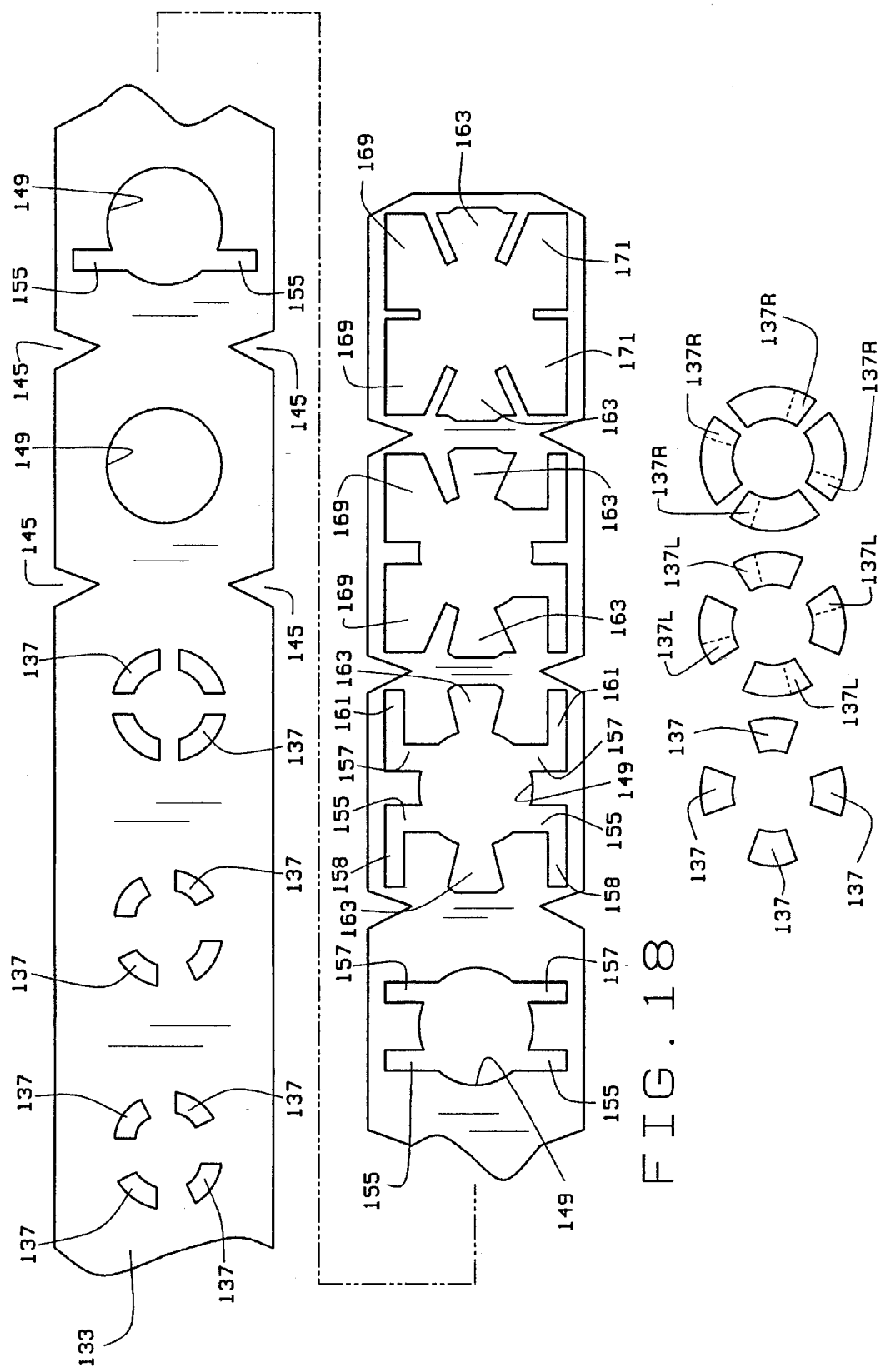
Figure 23:
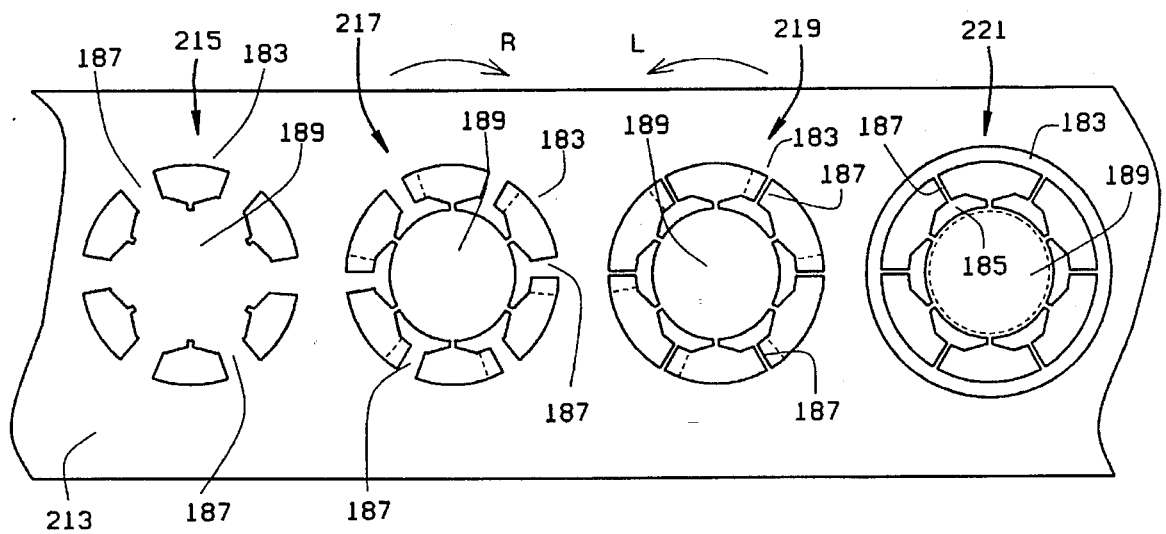
Figure 24:
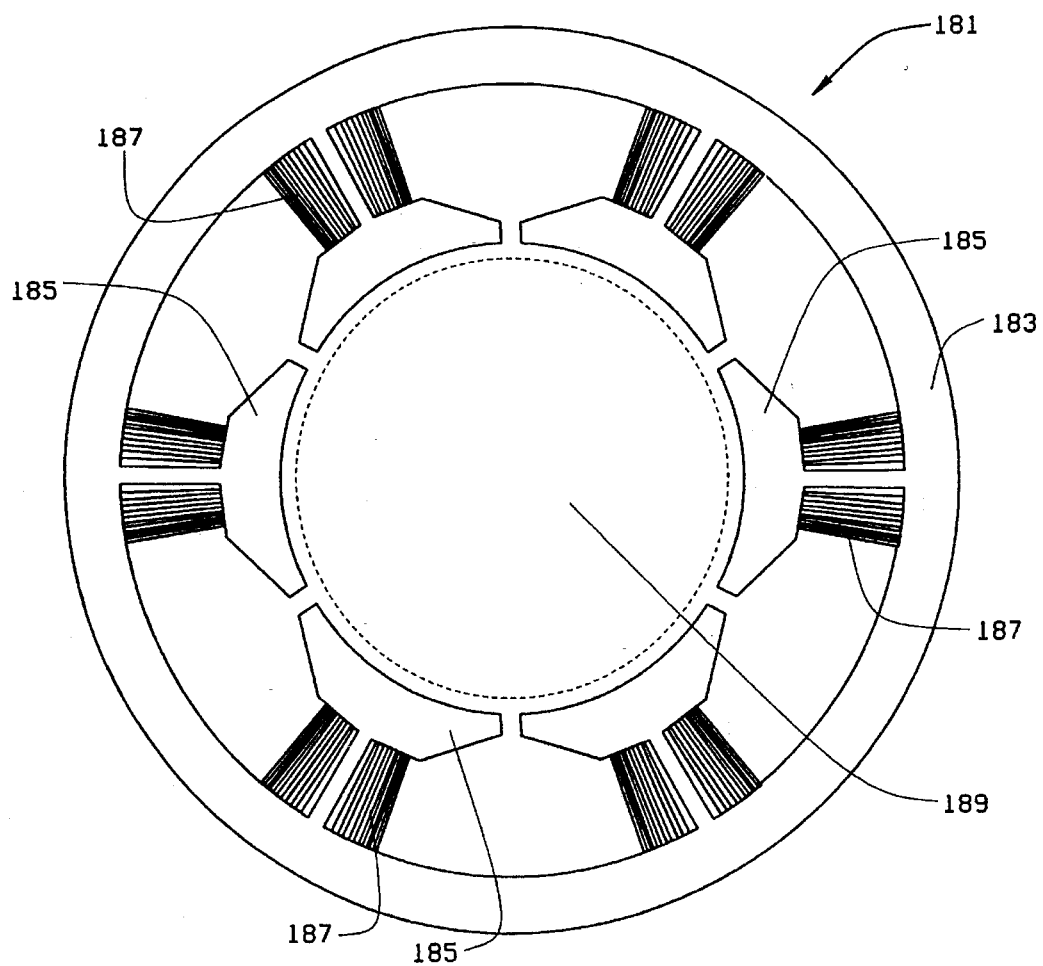
Figure 25:
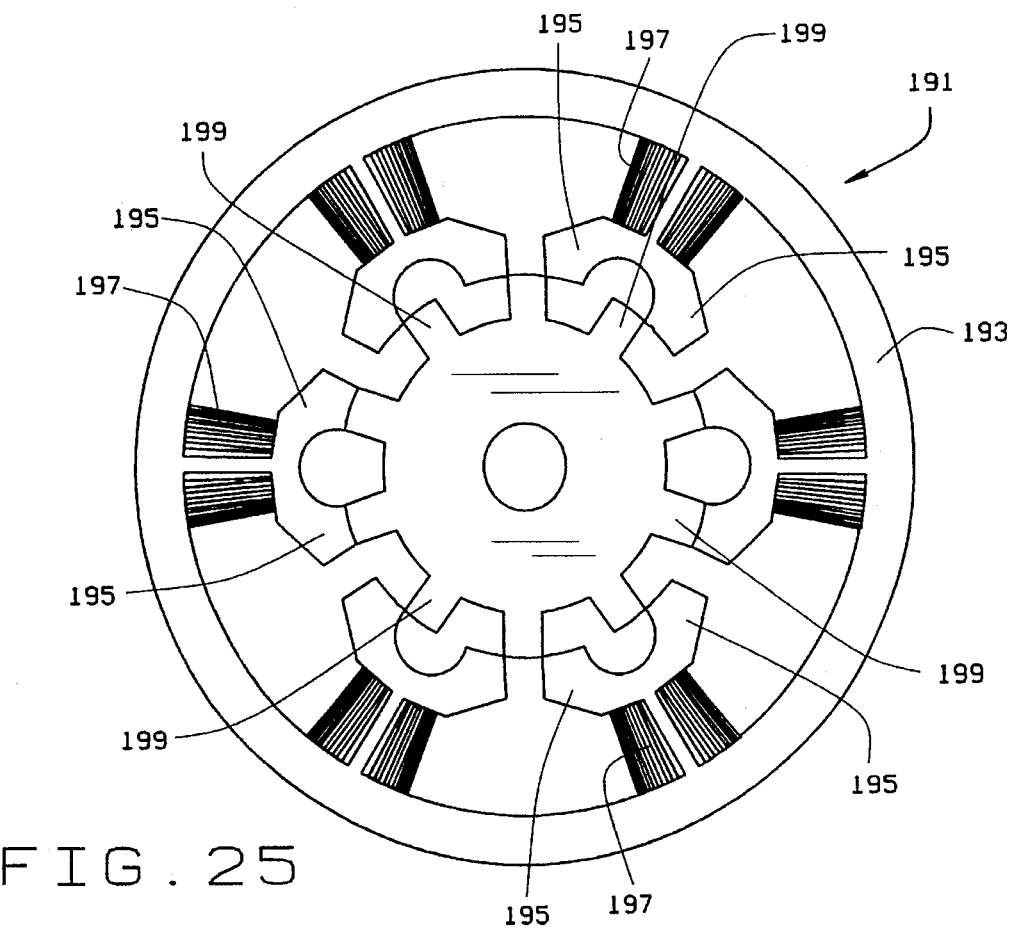
Figure 26:
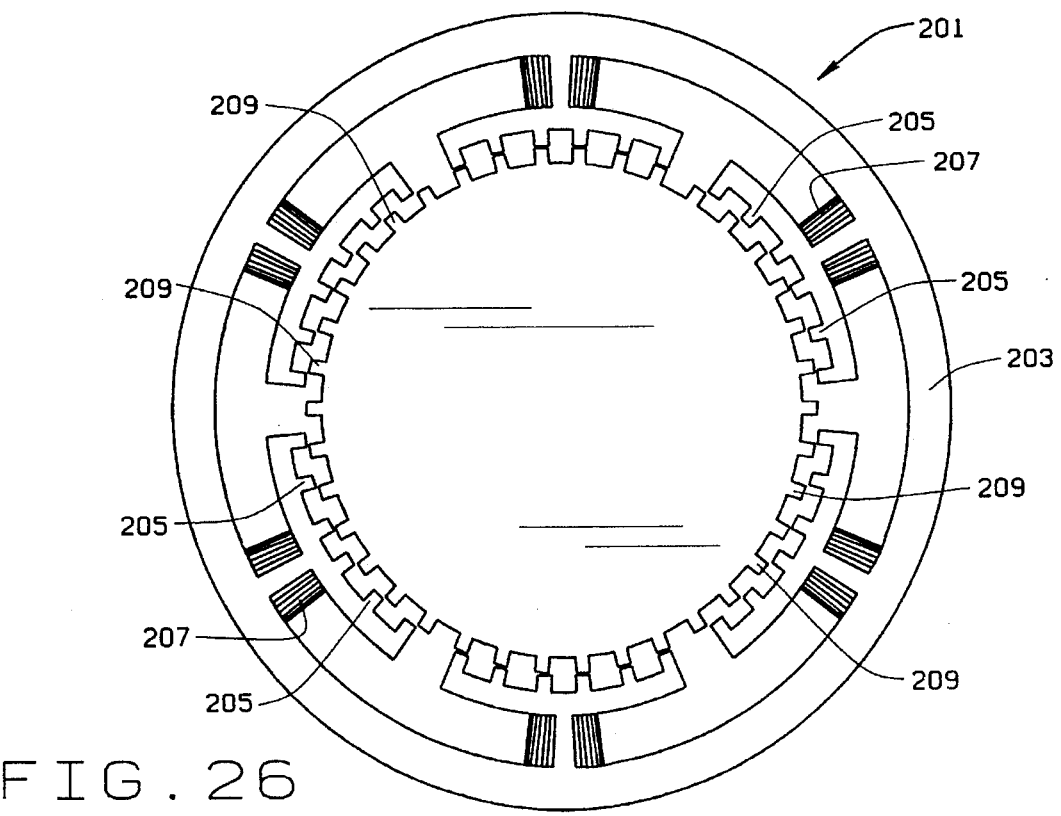
Figure 27:
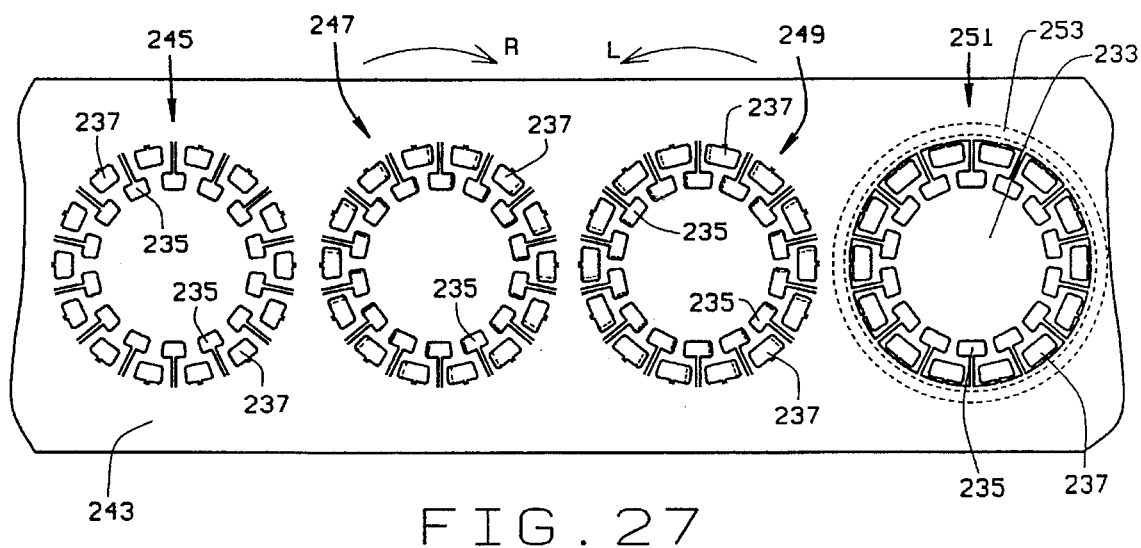
Figure 28:
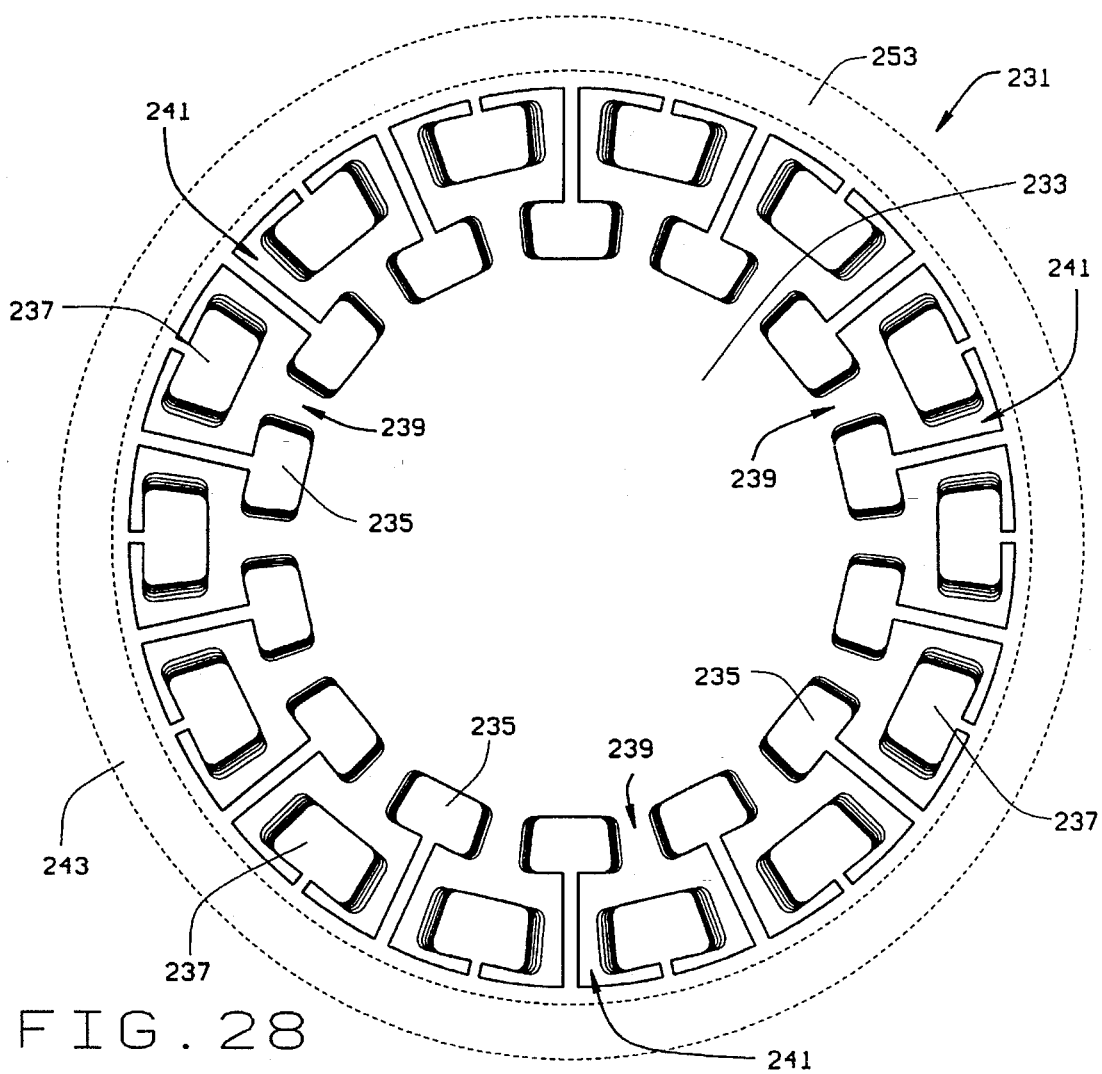
Figure 29:
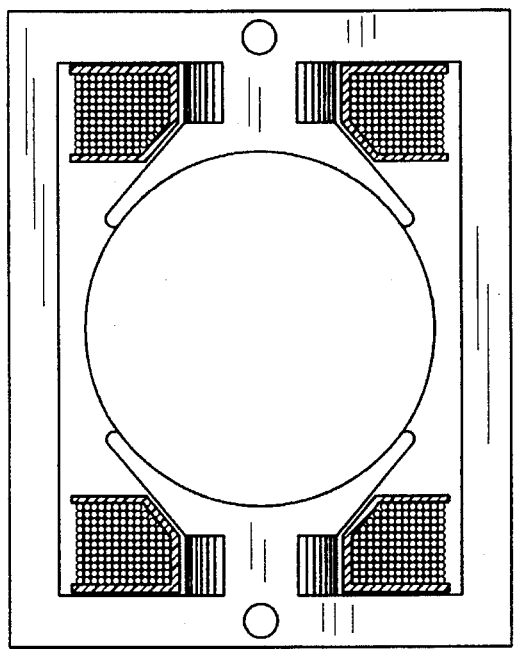
Figure 30:
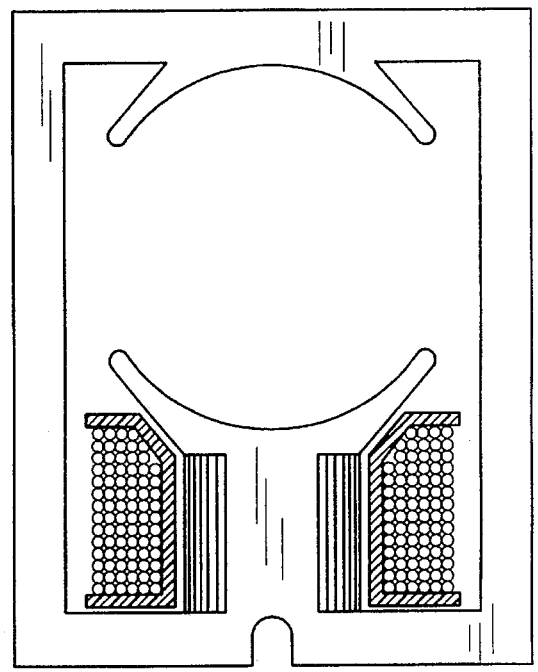
Figure 31:
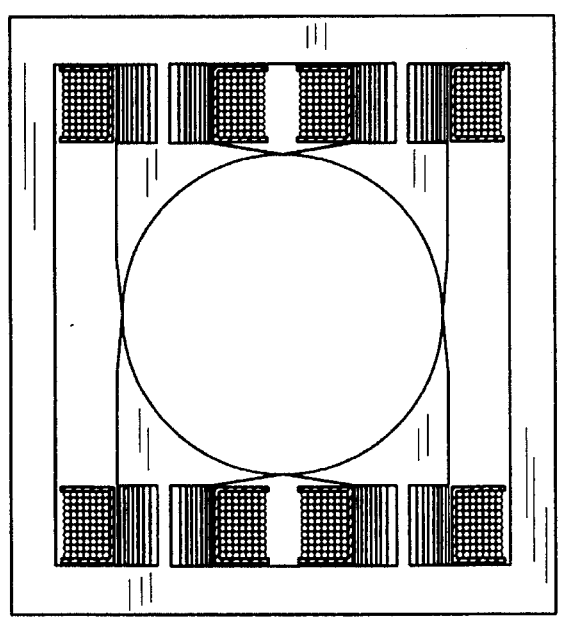
Figure 32:
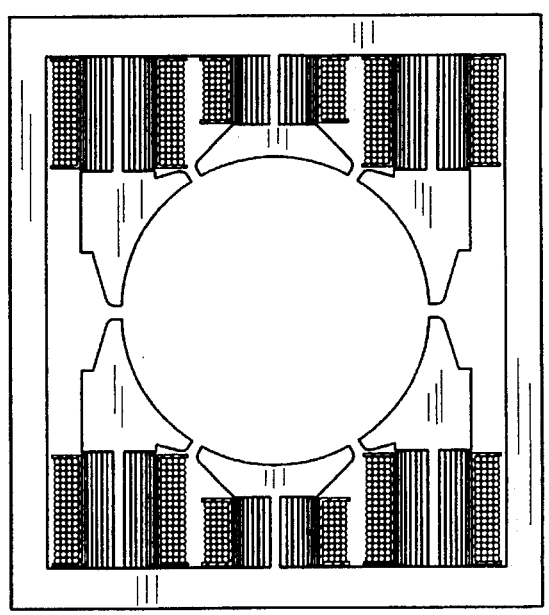
Figure 33:
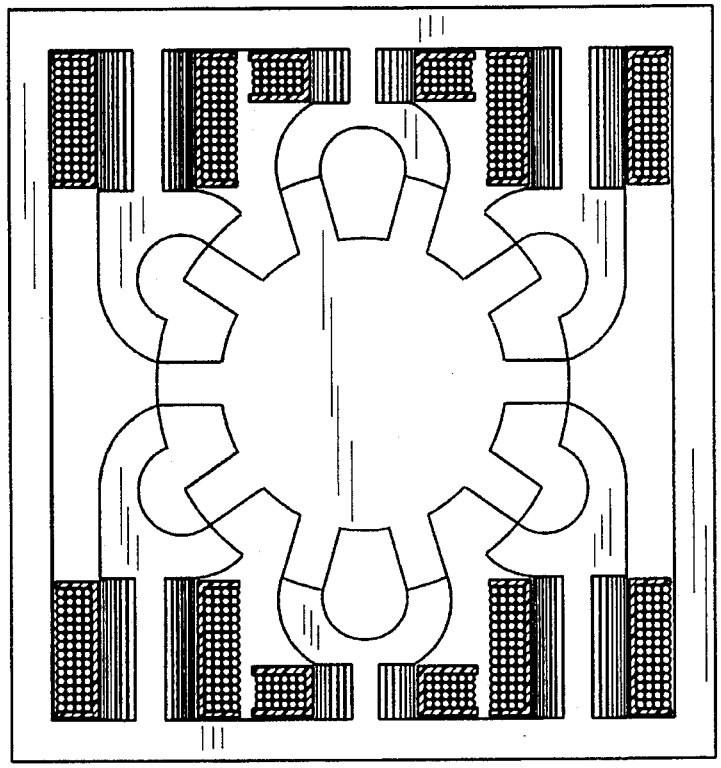
Figure 34:
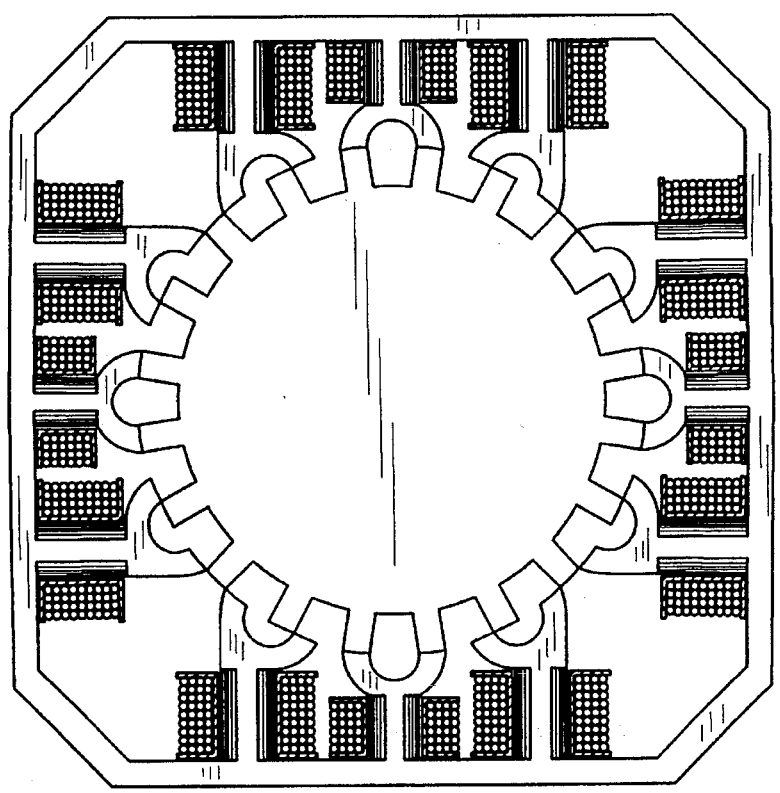

Figure lid is an end elevational view of a substantially greater stack height C-frame motor similar to that illustrated in FIG. 8D of the drawings;

FIG. 12 is a fragmentary top plan view of another punching or stamping layout for use in forming one-piece laminations for C-frame type motors such as those illustrated in FIGS. 11A–11D of the drawings;

FIG. 13 is a fragmentary top plan view of a punching or stamping die layout for use in forming stacked stator laminations and stacked coil winding laminations in a four pole motor construction such as that shown in FIGS. 14–15 of the drawings;

FIG. 14 is a side elevational view of a four pole motor employing the stacked stator laminations and stacked coil winding laminations of the type illustrated in the die layout of FIG. 13;

FIG. 15 is an end elevational view of the four pole motor shown in FIG. 14 of the drawings;

FIG. 16 is a fragmentary top plan view of a punching or stamping die layout used in forming a multi-pole stator/rotor motor such as shown in FIGS. 20–22 of the drawings;

FIG. 17 is a side elevational view illustrating the various punching or stamping stations used in the die layout illustration of FIG. 16;

FIG. 18 is an enlarged partial fragmentary view of some of the progressive die stations used in the die layout illustrated in FIG. 16 of the drawings;

FIG. 19 is an enlarged top plan view illustrating the use of rotary stamping dies for forming pole side sections used in the rotor pole construction shown in FIG. 20;

FIG. 20 is a side elevational view illustrating the construction of the stator and rotor poles in the six/four pole variable reluctance motor formed in the FIGS. 16–19 die layout;

FIG. 21 is a sectional view of the six/four pole variable reluctance motor shown in FIG. 19 of the drawings of the stacked stator lamination as viewed along line 21–21 of FIG. 20;

FIG. 22 is a sectional view illustrating the construction of the stacked rotor and stator laminations used in the variable reluctance motor shown in FIG. 19 of the drawings, as viewed along line 22—22 of FIG. 19;

FIG. 23 is a fragmentary top plan view illustrating a rotary stamping die layout used in constructing the winding areas of the stator poles illustrated in the FIG. 24 construction;

FIG. 24 is an enlarged side elevational view illustrating a stator construction with poles having coil winding areas of generally circular outer cross sectional shapes;

FIG. 25 is a side elevational view of generally circular coil winding segments similar to FIG. 24, but including 12 stator and 10 rotor poles in a variable reluctance motor construction;

FIG. 26 is a side elevational view of generally circular coil winding segments similar to FIG. 24 in a variable reluctance motor construction having 36 stator poles and 38 rotor poles;

FIG. 27 is an enlarged fragmentary rotary stamping die layout illustrating several of the progressive stamping stations used in forming the inside-out stator construction shown in FIG. 28 of the drawings;

FIG. 28 illustrates a top plan view of the inside-out stator lamination construction for an inside-out motor where the coil winding area or segments are formed with a generally circular outer cross sectional shape;

FIG. 29 is a side,elevational view of one type of universal motor that can be constructed by the method and apparatus of the present invention;

FIG. 30 is a side elevational view of another type of universal motor that can be constructed by the method and apparatus of the present invention;

FIG. 31 is a side elevational view of another type of four pole motor that can be constructed by the method and apparatus of the present invention;

FIG. 32 is a side elevational view of another type of six pole motor that can be constructed by the method and apparatus of the present invention;

FIG. 33 is a side elevational view of another type of ten pole motor/twelve pole stator variable reluctance motor that can be constructed by the method and apparatus of the present invention;

FIG. 34 is a side elevational view of another type of twenty pole rotor/twenty-four pole stator variable reluctance motor that can be constructed by the method and apparatus of the present invention;

FIG. 35 is a top plan view of a die layout for forming E/I transformers which uses a press stroked indexed cam for moving punching or stamping dies generally transversely to an elongated strip of coil stock;

FIG. 36 is a side elevational view of the stamping or punching dies used in the E/I die layout shown in FIG. 35;

FIG. 37 is a side elevational view of coil stock being fed between progressive die stations with extra U-shaped material loops between adjacent die stations;

FIG. 38 is a top plan view of an E/I die layout in which strip feed mechanisms are used to move the coil stock longitudinally relative to punching dies, following indexing between punching or stamping die stations; and FIG. 39 is also a top plan view similar to FIG. 38, but illustrating the transverse movement of the coil stock relative to stamping or punching dies, following indexing of same between adjacent die stations.

Corresponding reference numerals will be used throughout the several figures of the drawings.

DESCRIPTION OF THE PREFERRED EMBODIMENTS

The following detailed description illustrates the invention by way of example and not by way of limitation. The description will clearly enable one skilled in the art to make and use the invention, and describes several embodiments, adaptions, variations, alternatives and uses of the invention, including what we presently believe is the best mode of carrying out the invention.

In the discussion that follows, it will be understood that the term "magnetically conductive material" includes coil stock in the form of an elongated strip wound in coil form, strip stock in the form of an elongated strip of unwound material or sheet material having predetermined specific widths or lengths as desired; the term "forming element" includes punching or stamping dies as well as laser, hydrojet or other cutting devices that can be moved in any direction in any predetermined linear and/or curvilinear path relative to the magnetically conductive material; and the term "feeding mechanism" includes any feeding device for moving magnetically conductive material in a predetermined direction or path relative to forming elements.

Before discussing the novel and unique method and apparatus for forming variable laminations from magnetically conductive material so as to stack such laminations in preferred arrangements for use in electro-magnetic induction devices, it is important to understand the construction and operation of such electro-magnetic induction devices as background context for the present invention.

Electro-magnetic induction devices such as motors, transformers, inductors and the like use an electrically conductive coil or coils wound about or associated with a magnetic inductor circuit of the electro-magnetic induction devices. In a motor, for example, an electrically conductive coil is wound about a winding area to create, through current flowing in the electrically conductive coil, a magnetic field. The magnetic field is induced into the magnetic inductor circuit which includes the poles of the motor. Thus, flux moving between the poles in a magnetic inductor circuit creates a tangential force which is imparted to an associated rotor. Transformers and inductors, on the other hand, have no moving parts; however, energy is transferred from an electrically conductive coil to a magnetic inductor circuit by electro-magnetic induction in a similar manner for developing the desired transformer or inductor action.

As disclosed in my prior aforementioned copending patent applications, by changing the winding area of the poles to a substantially circular outer cross sectional configuration, at least along opposed spaced areas thereof, several important advantages are achieved. First, a substantially circular outer cross sectional shape provides the cross sectional area with the shortest circumference in the magnetic inductor circuit to wind the electrically conductive wire in forming each electrically conductive coil. Additionally, the aforementioned generally circular outer cross sectional shape also enables the electrically conductive wire to be layer wound in closely packed relationship in a plurality of superimposed rows. This is achieved either by direct winding of an electrically conductive wire on the winding area or through the use of an insulating bobbin which permits the electrically conductive wire to be layer wound in the above described manner to form the electrically conductive coil. As a result, a close fitting and efficiently wound electrically conductive coil can be provided. Not only is there a substantial reduction in the amount of material required for the electrically conductive coil, but in certain instances, the amount of material required for the laminations in the magnetic inductor circuit is also reduced. Moreover, additional savings are capable of being realized in other components such as smaller end bell component savings in motors.

As disclosed in my aforementioned prior copending patent applications, each of the winding areas are formed with an incrementally stepped and segmented shape such that when they are stacked in a predetermined arrangement, the combined configuration provides a generally circular outer cross sectional shape at least along opposed face sections thereof, in order to take advantage of all of the features set forth above. Consistent with the disclosure of my aforementioned copending patent applications, it will be apparent that a full circular shape and other modified shapes having a smaller outer peripheral shape other than a square or rectangular shape also fall within the definition of a generally outer cross sectional shape.

The present invention discloses an improved method and apparatus for forming and stacking laminations, constructed as discussed above, for application to a wide range of motors, transformers, inductors and the like, some of which are disclosed in my prior copending patent applications and some of which are also disclosed in the present application. It will be understood; however, that the method and apparatus of the present invention is not limited to specific types or kinds of motors, transformers, inductors or the like; rather, it is intended that the method and apparatus of the present invention be usefully employed for all possible electro-magnetic induction device applications.

Figure 9:
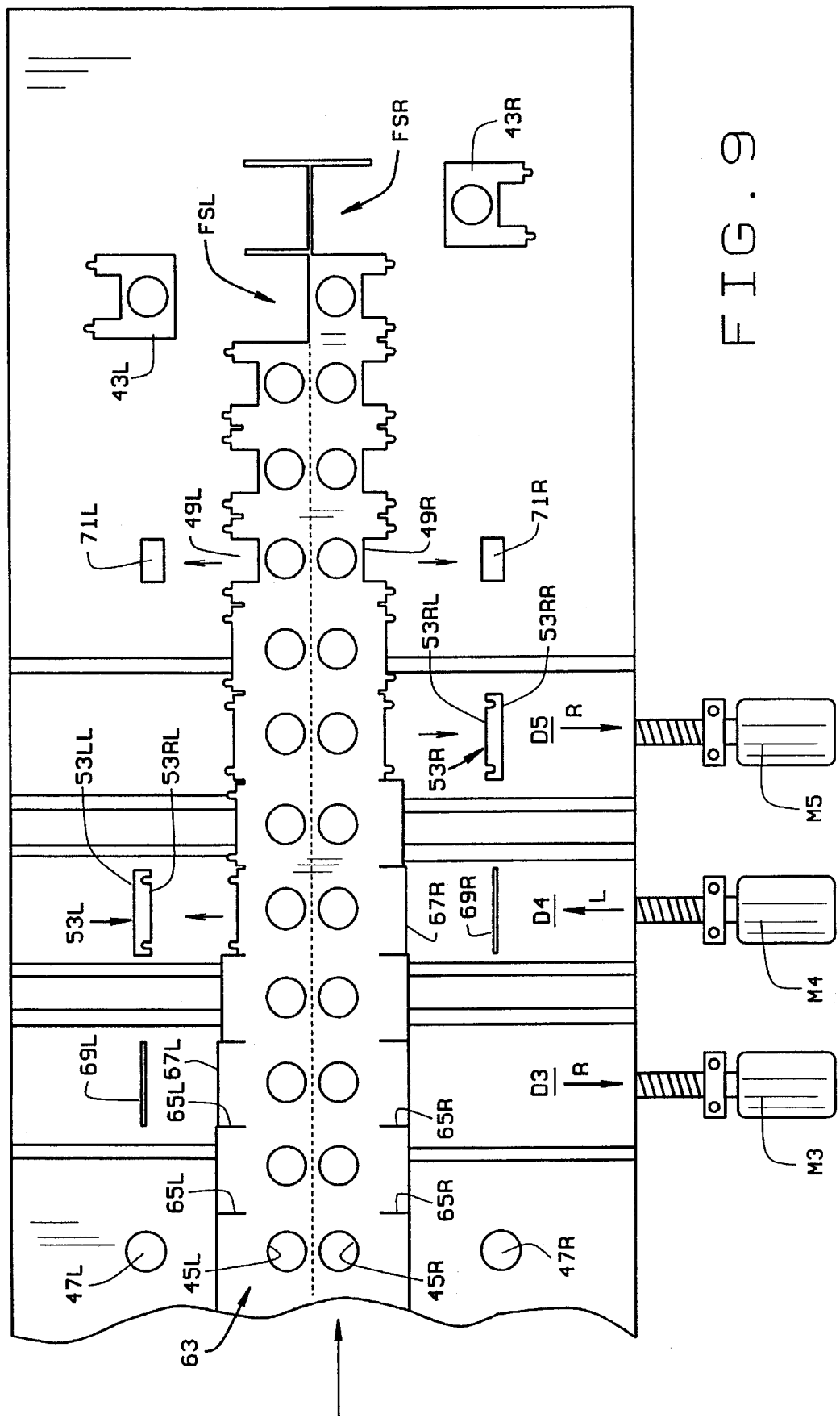
FIG. 9 is a fragmentary top plan view of a modified form of punching or stamping die layout for use in forming the modified C-frame motors illustrated in FIG. 11A–11D of the drawings.
Figure 10:
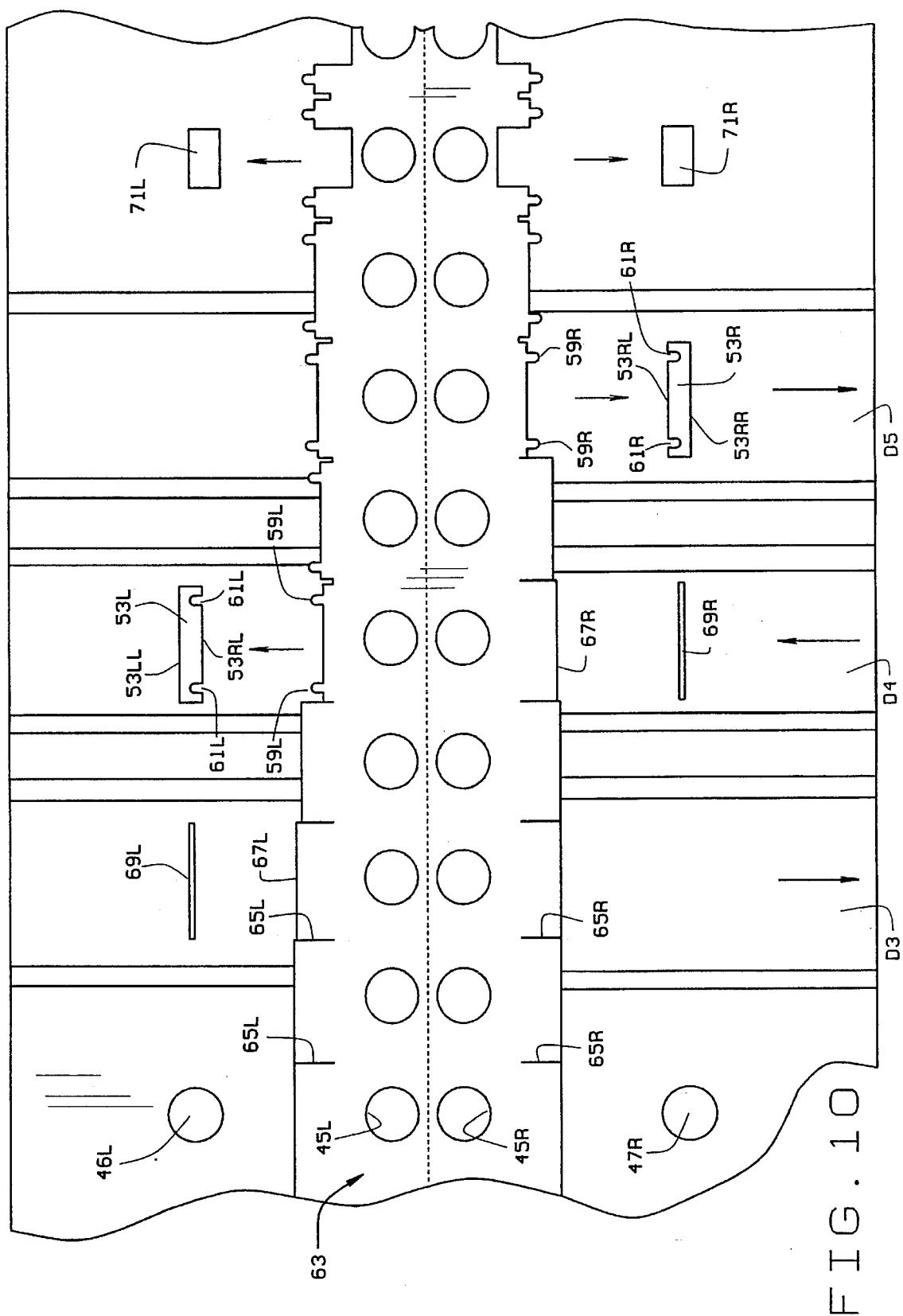
FIG. 10 is a fragmentary top plan view of a further enlarged die layout of FIG. 9.
Figure 11A:
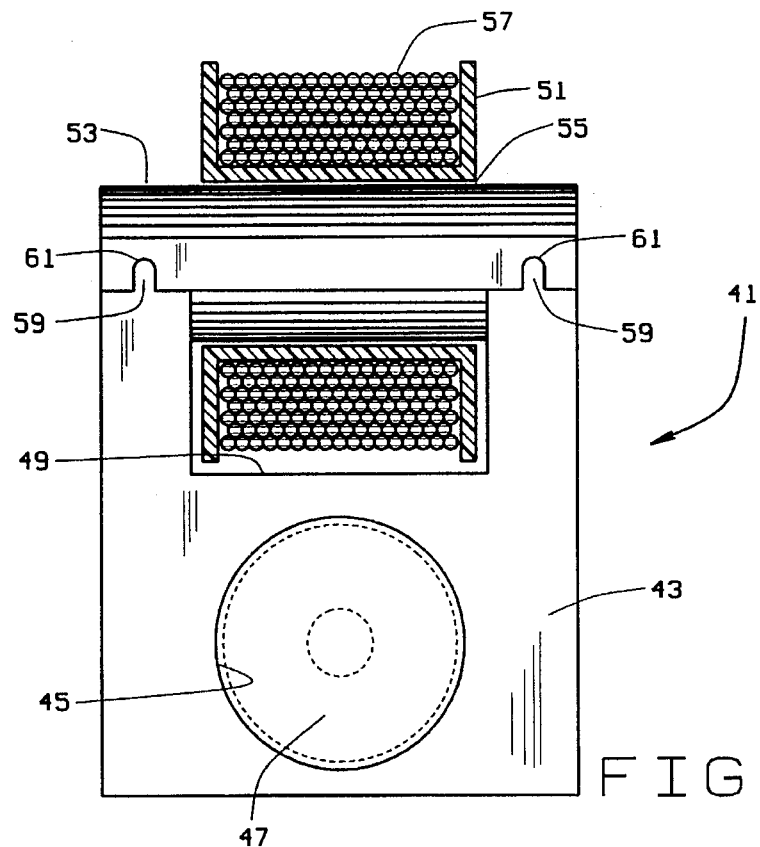
FIG. 11A is a side elevational view of a modified C-frame motor construction generally similar to the C-frame motor shown in FIG. 8A of the drawing, except with respect to certain horsepower sizes shown in FIGS. 11B–11D.
Figures 11B, 11C, 11D:
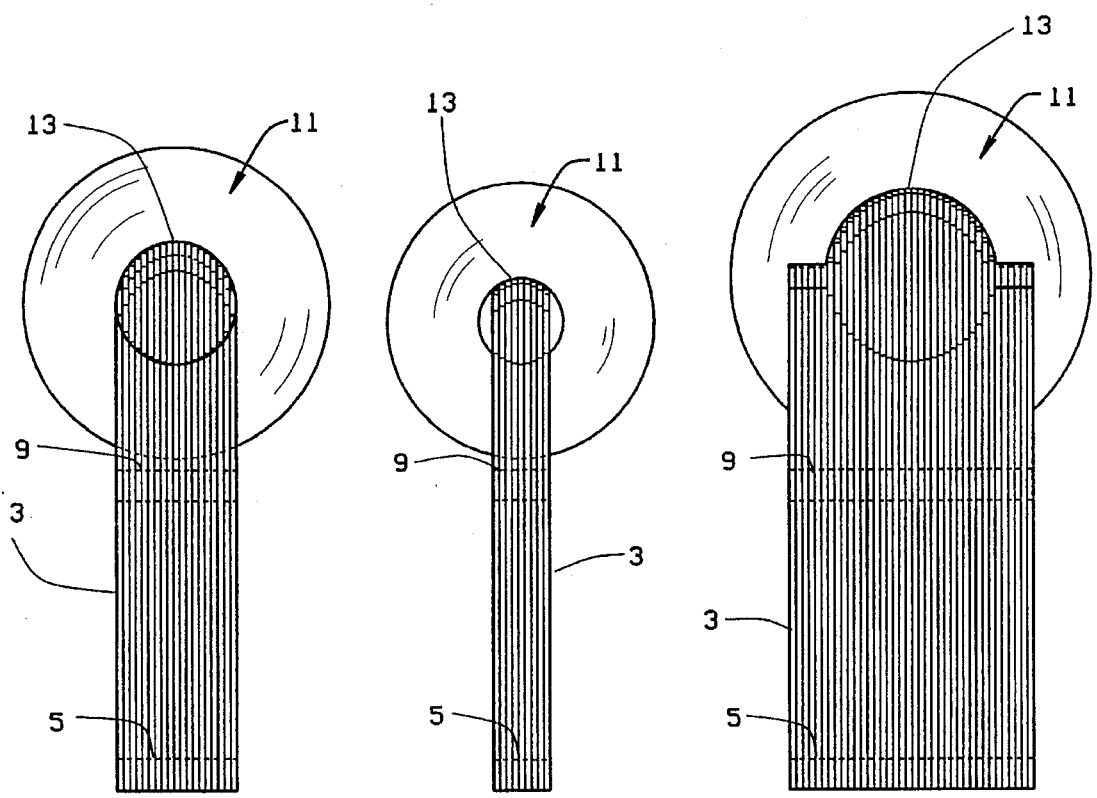
FIG. 11B is an end elevational view of a predetermined number of stacked laminations used in a particular horsepower size of C-frame motor corresponding to that illustrated in Figure 8B of the drawings.
FIG. 11C is an end elevational view of a smaller stack height C-frame motor construction varying from that shown in 8C of the drawings in that the coil winding area does not have a full circular configuration, but rather has a generally circular configuration at least along opposed space sections thereof as compared to the construction illustrated in FIG. 8C.

The present invention specifically discloses the method and apparatus of the present invention for use in the following different applications: FIGS. 1–7 disclose a method and apparatus for forming variable laminations for use in a wide range of C-frame horsepower sizes shown in FIGS. 8A–8D; Figures 9–10 also disclose a method and apparatus for forming C-frame and coil winding laminations for a similar but slightly different C-frame motor shown in FIGS. 11A–11D; FIG. 12 discloses a method and apparatus for forming one winding area C-frame laminations for forming a motor similar to that drawn in Figures 11A–11D of the drawings; FIG. 13 illustrates the method and apparatus for making stacked laminations and coil winding laminations for use in a four pole motor shown in FIGS. 14–15; FIGS. 16–19 disclose the method and apparatus for forming a variable reluctance motor of the type illustrated in Figures 20–22; FIG. 23 discloses a method and apparatus for forming a six pole motor shown in FIGS. 24; FIGS. 25–26 show variable reluctance motors manufactured by the method illustrated in FIG. 23; FIG. 27 discloses a method for forming an inside-out motor illustrated in FIGS. 28; FIGS. 29–34 illustrate other various types of motor designs that can be manufactured by the method and apparatus of the present invention; FIGS. 35–36 illustrate a press stroke indexed cam for use in moving punching or stamping dies relative to an elongated strip of magnetic conductive material; and FIGS. 37–39 disclose a method and apparatus for moving an elongated strip relative to punching or stamping dies, either longitudinally as illustrated in FIG. 38 or transversely as illustrated in FIG. 39.

Each of the methods and apparatus and related motors discussed above will be described in detail below.

Reference is first made to the method and apparatus illustrated in FIGS. 1–7 of the drawings for forming the C-frame line of motors illustrated in FIGS. 8A–8D of the drawings. Construction of the C-frame motor 1 illustrated in FIGS. 8A–SD of the drawings includes a predetermined number of stacked stator laminations 3, each of which have a rotor opening 5 at one end for alignment with one another for receiving the rotor 7. The rotor 7 is initially formed from the rotor openings 5 in manufacturing the stator laminations 3. At an opposite end from the rotor opening 5 is a U-shaped opening 9 for receiving a bobbin 11 that is mounted over stacked coil winding laminations 13 which have a generally circular outer cross sectional shape, at least along opposed spaced sections thereof, for reception of the cylindrically shaped center connecting wall 15 of the bobbin 11. This allows an electrically conductive wire 17 to be wound about a cross sectional area with the shortest circumference to reduce the amount of electrically conductive wire required, without sacrificing motor efficiency. The stacked stator laminations 3 each have spaced male bosses 19, 19 for complementary interlocking engagement with complementary shaped female openings 21, 21 formed in the coil winding laminations 13. The complementary spaced male bosses 19, 19 and associated complementary shaped female openings 21, 21 are formed outside of the U-shaped opening so as to avoid any interference with the bobbin 11 and its associated electrically conductive wound wire 17.

FIGS. 8B–8D illustrate a line of C-frame motors of different horsepower having the same diameter rotor opening 5 and U-shaped opening 9. FIGS. 8B–8D differ from one another by the use of different stack heights. In FIG. 8B of the drawings, the width of the coil winding area 13 equals that of the stack height, while FIG. 8C shows approximately one-half the size of the stack height illustrated in FIG. 8B with a coil winding area cross section approximately one-half of that illustrated in FIG. 8B. FIGS. 8D illustrates a stack height nearly double that of the stack height shown in FIGS. 8B of the drawings and a coil winding area 13 approximately twice the area illustrated in FIG. 8B. The bobbins 11 also differ in size for each of the motors illustrated in FIGS. 8B–8D.

Attention is now directed to FIGS. 1–7 of the drawings which illustrate the method and apparatus for forming the C-frame stator laminations 3, the rotor laminations 7 and the coil winding laminations 13. As will be seen, an elongated strip of magnetically conductive coil stock 23 is fed from left to right as illustrated by the arrow at the left hand side of FIG. 1. The coil stock 23 is progressively fed, by well-known stock feeding mechanisms (not shown) through various stages or stations forming a progressive punching or stamping system. These stages or stations in the manufacturing method and apparatus are represented by the die layout illustrated in FIGS. 1–3 of the drawings to illustrate how the various punching or stamping stages or stations work on the coil stock 23. It will be understood that additional stages or steps in the actual manufacturing process may be required to produce the specific electro-magnetic induction device desired. It will be further understood that other types of magnetic conductive material can be utilized such as strip stock or sheet material, and other types of forming elements such as laser, hydro-jet or other cutting devices may also be employed in lieu of punching or stamping dies, as discussed above.

Because two mirror image C-frame motor laminations 3 and coil winding laminations 13 are being simultaneously formed in the method and apparatus shown in FIGS. 1–7, a dotted line separates the left and right laminations to facilitate understanding.

As viewed from left to right, the successive series of die cutting steps first includes the forming of a spaced rotor opening 5L within the confines of a left lamination 3L to be formed, as shown by the spaced notches 25L, 25L. As the rotor opening 5L is formed in the coil stock 23 first on the left side and then a corresponding rotor opening 5R is formed on the right side of the coil stock 23, the rotor laminations 7L and 7R will be punched or stamped out from the coil stock 23 for subsequent use in forming the rotor 7 used in the C-frame motor 1 shown in FIG. 8A. Scrap 27L and 27R from each of the spaced notches 25L, 25L and 25R, 25R are also produced, as shown.

Once spaced pairs of rotor openings 5L, 5R are formed in mirror image laminations 3L and 3R, a movable die set D1 moves relative to the coil stock 23, following indexing of the coil stock 23. The movable die set D1 is moved by the computer or electronically controlled drive motor M1 to the right as shown by right arrow R to form a trapezoidal opening 29R in the right lamination 3R to be formed. The right side of the trapezoidal opening 29R forms the left side 13RL of the coil winding lamination 13R. At the same time, the wide notch 33L is formed in the left side of the left lamination 3L which forms the left side 13LL for the left coil winding lamination 13L.

The next movable die section D2 is moved by the computer or electronically controlled drive motor M2 to the left, as shown by the left arrow L, causing the wide notch 35R to be formed in the right side of the right lamination 3R, which forms the right side 13RR of the coil winding lamination 13R. The wide notch 33R produces the scrap notch section 35R to the right side of the coil stock 23, as shown. At the same time, a trapezoidal opening 29L is formed in the left lamination 3L to be formed, the longer side of which forms the right side 13LR of the left coil winding lamination 13L.

The next die station then blanks out the right and left coil winding laminations 13R, 13L, respectively, as well as blanking out the three sides of the U-shaped opening 9L and 9R for the left and right laminations 3L, 3R, respectively. In forming the U-shaped openings 9L and 9R, scrap sections 37L, 37R are also blanked from coil stock at the same time the left and right coil winding lamination 13L and 13R are formed.

Figure 3:
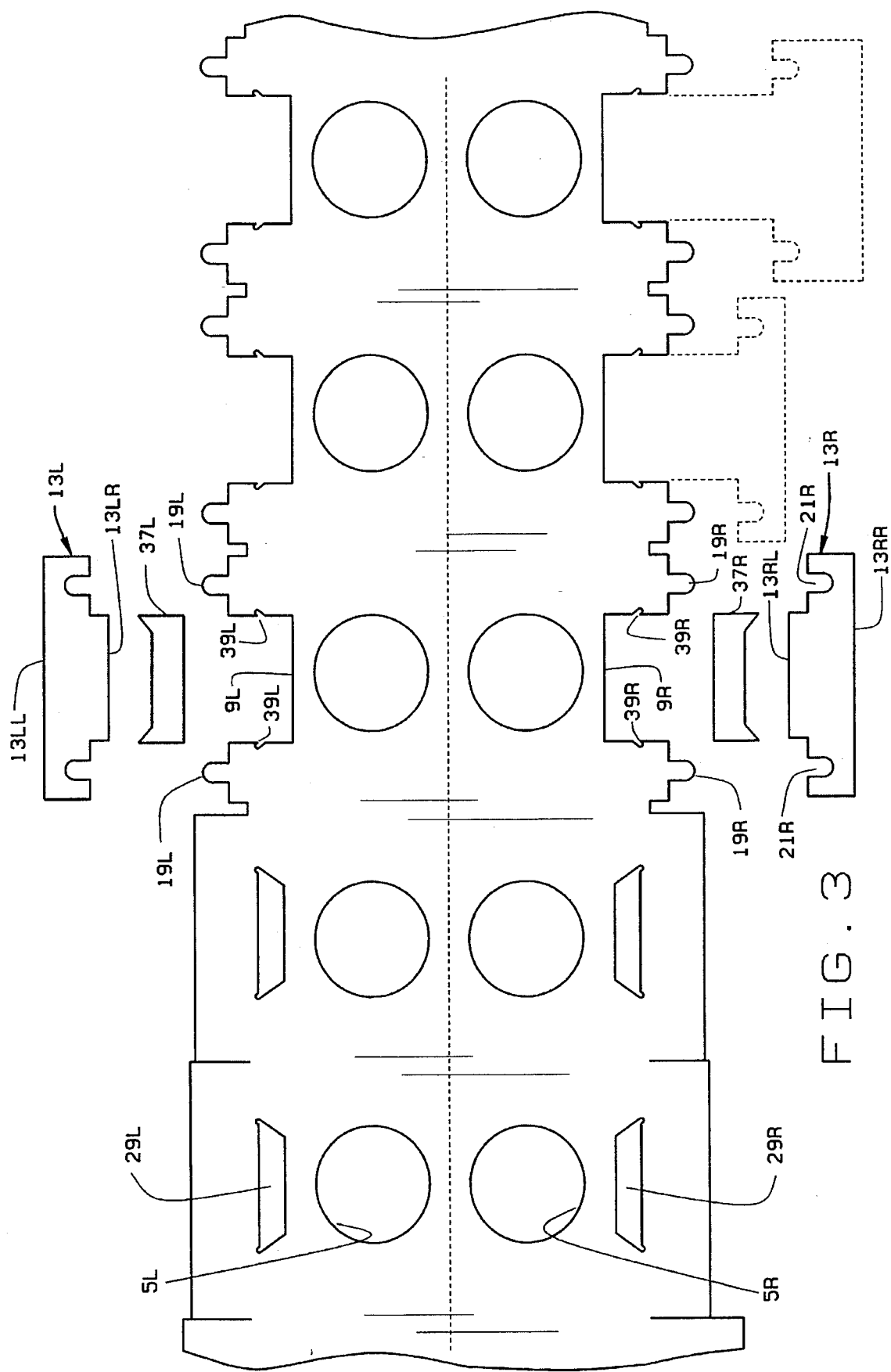
FIG. 3 is a fragmentary top plan view of even a further enlarged die layout of FIG. 2.
Figure 4:
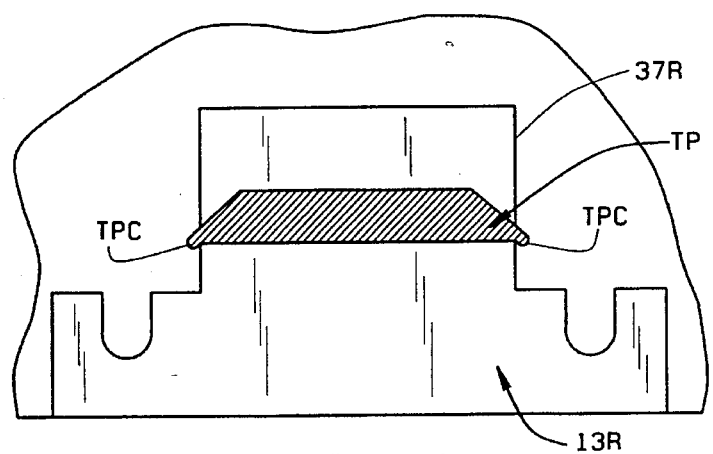
FIG. 4 is a fragmentary top plan view illustrating the forming of a coil winding lamination separate from a C-frame stator lamination as well as the forming of the U-shaped opening in the C-frame stator lamination.
Figure 5:
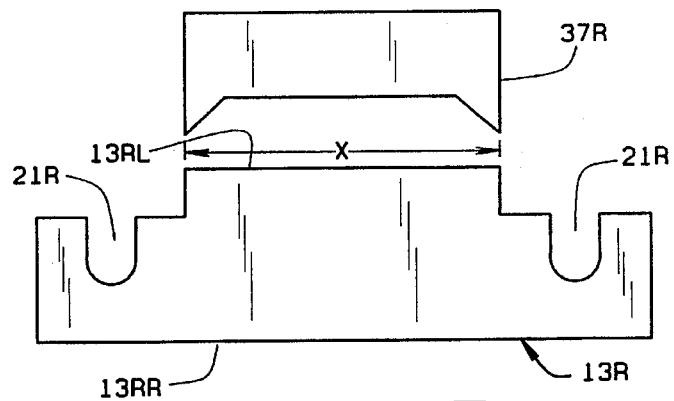
FIG. 5 is a top plan view of the coil winding lamination and separate scrap piece which results from the formation of the coil winding lamination and U-shaped opening in the C-frame stator lamination.

FIGS. 4 and 5 show the purpose of the trapezoidal shaped punch TP that is used for forming the trapezoidal openings 29R, 29L. The trapezoidal shaped punch TP provides a small notched or corner area TPC on opposite sides of the trapezoidal punch TP that forms the spaced notches 39R, 39R and 39L, 39L in the material surrounding the U-shaped openings 9R and 9L, as shown in FIG. 3. The small notches 39R, 39R and 39L, 39L enable the coil winding laminations 13R, 13L and the scrap sections 37R, 37L to cut away separately and cleanly from the coil stock 23. This also assures a line-to-line fit since the width X of the coil winding lamination 13R across the left side 13RL, for example, is essentially the same size as that of the U-shaped opening 9R.

Figure 1:
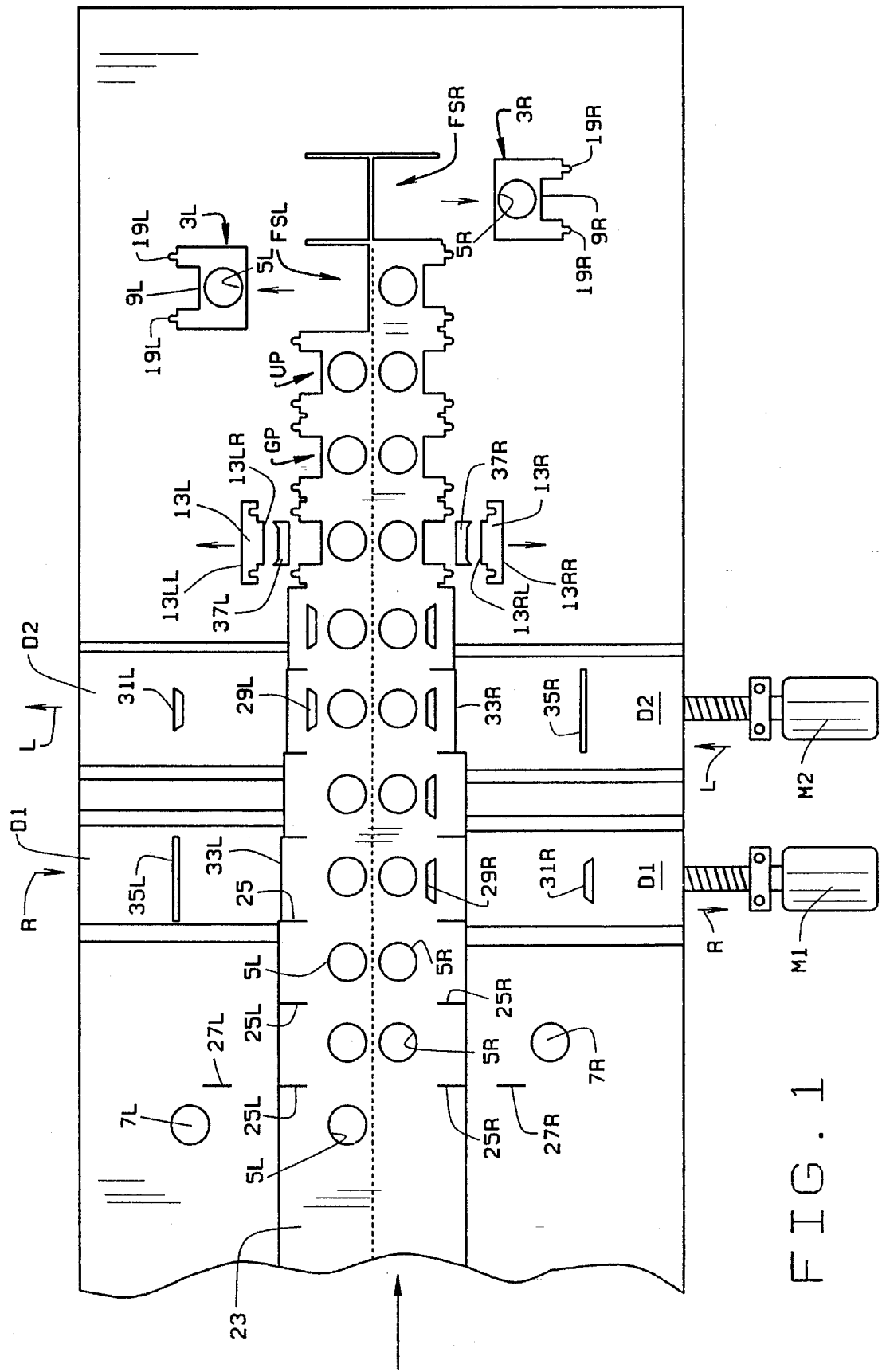
FIG. 1 is a top plan view of a punching or stamping die layout used in the manufacture of laminations for C-frame motors of the type illustrated in Figure 8A–8D of the drawings.

To make the coil winding lamination 13R and the U-shaped opening 9R in the right lamination 3R, the lamination punch is ungaged. To make wider laminations for a taller stack height motor, such is shown in FIGS. 6D, for example, this punch and punch GP are gagged and punch UP is ungagged as illustrated in FIG. 1, while also using proper wider width material. More sizes could be made by adding more gag punches. For example, see the dotted line representation of gag punches in the lower right hand corner of FIG. 3 for use with different material widths. In concluding the stamping operation, the left and right stator lamination 3L and 3R are then stamped out in final stamping stations FSL for the left lamination 3L and FSR for the right lamination 3R.

Figure 6:
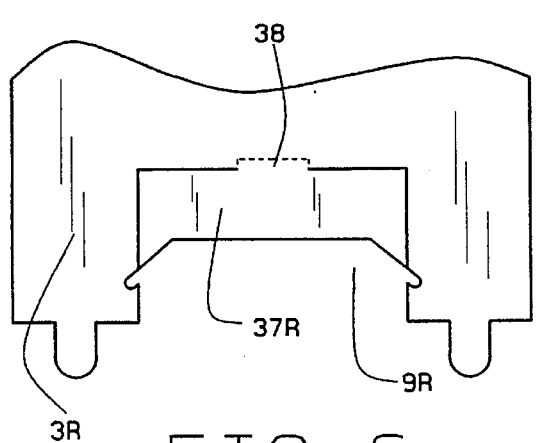
FIG. 6 is a fragmentary top plan view of an alternate sequential method for removing the coil winding lamination and scrap piece from the U-shaped opening in the C-frame motor lamination.
Figure 7:
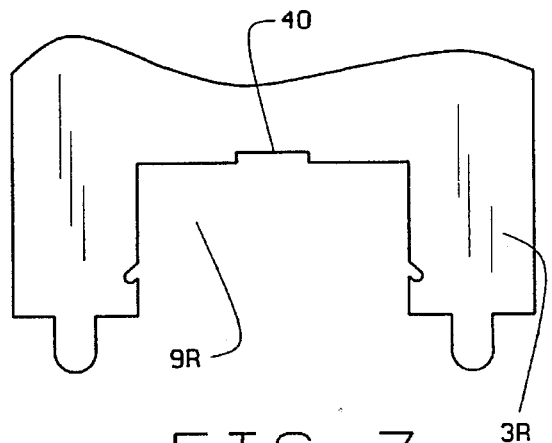
FIG. 7 is a fragmentary top plan view of the alternate sequential method shown in FIG. 6 with the scrap piece removed from the C-frame motor lamination.

An alternate to simultaneous removal of the coil winding lamination 13R, 3L and the scrap sections 37R, 37L is shown in FIGS. 6–7 of the drawings. FIG. 6 shows the scrap section 37R retained in attached position at 38 to the right lamination 3R to be formed, even through the coil winding lamination 13R has already been stamped and separated from the coil stock when the U-shaped opening 9R is simultaneously formed, as described above. At a later die station, the scrap section 37 is removed from the U-shaped opening 9R, as shown in FIG. 7, leaving only a small notched area 40 where the scrap section 37R had been previously attached at 38 to the right lamination 3R to be formed.

Figure 2:
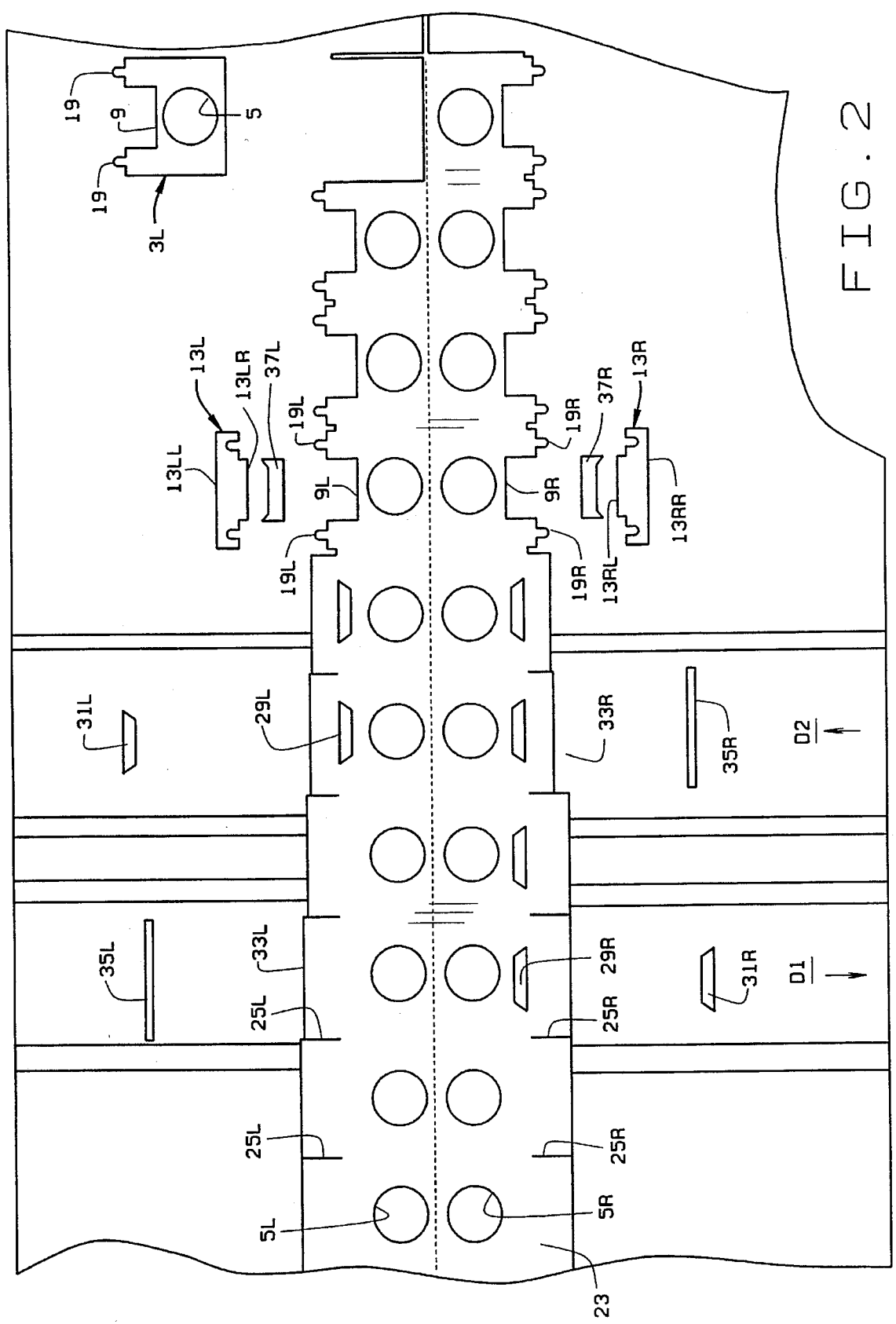
FIG. 2 is a fragmentary top plan view of a further enlarged die layout of FIG. 1.

As seen in each of FIGS. 1–3, but as best seen in FIGS. 2–3, the width of the combined right and left side laminations 3R, 3L are reduced in width due to the varying amount of material removed as the wide notches 33 R, 33 L are operated by the computer controlled stepper motors M1 and M2 to move to the desired location for producing stair stepped or incremental differences of predetermined incrementally varying widths. As a result, when a predetermined number of coil winding laminations 13L or 13R are used with a corresponding number of stator laminations 3L or 3R, the coil winding laminations 13L, 13R are arranged to be stacked, by any suitable means, as a predetermined combined coil winding area of generally circular outer cross sectional shape, at least along opposed spaced sections thereof. The manner in which this is accomplished is best explained in all of my aforementioned copending prior patent applications; however, it will be understood that the coil winding laminations 13R and 13L are stacked to provide the configurations illustrated in FIG. 8A–8B of the drawings where the combined stacked laminations provide a coil winding area of generally circular outer cross sectional shape at least along opposed spaced sections thereof.

Once the stacked coil winding laminations 13R and 13L are formed in a manner illustrated in FIGS. 8A–8B of the drawings, the insulating bobbin 11 with the electrically conductive coil 17 is mounted over the coil winding laminations 13R and 13L, in each instance, after which the stator laminations 3R or 3L are assembled to the respective coil winding laminations 13R or 13L through the complementary male and female fastener connections 19, 19 and 21, 21, as will be understood.

The C-frame line of motors shown in FIGS. 8A–SD can be changed by simply changing the coil stock width and utilizing a different size bobbin, in certain instances. The die layout shown in FIGS. 1–3 is arranged so that the coil winding area 13 is formed independently from the C-shaped lamination 3. All that is required is that enough of the motors that use less laminations for the winding area laminations 13 than for the stator laminations 3 be made to provide the extra laminations required for the shorter stack motors that use more laminations for the coil winding lamination. This is, in part, illustrated in FIGS. 8B–8D where the widest stack height shown in FIG. 8D is manufactured to provide additional laminations needed for the coil winding areas of the shorter stack height motor shown in FIG. 8C. FIG. 8B shows the crossover point where the number of coil winding laminations 13 are equal to the stator laminations 3.

It will also be noted that in the shorter stack height motor shown in FIG. 8C, the core or coil winding area 13 extends partially beyond the width of the stacked stator laminations 3. This is not the case with the greater stack height motor illustrated in FIG. 8D where the stator laminations 3 actually extend beyond the width of the coil winding laminations 13. However, due to the independent forming of the stator laminations in coil winding laminations, a line of C-frame motors of different horsepower having the same diameter rotor opening can be constructed.

In lieu of punching or stamping dies, one or more laser, hydro-jet or other cutting devices (not shown) can be arranged in a predetermined format for movement in any direction in any linear and/or curvilinear path relative to the coil stock or other magnetic conductive material for forming the stator laminations and coil winding laminations. In such instance, the one or more laser devices serve as forming elements which are moved relative to magnetically conductive material in forming the stator laminations and coil winding laminations. This same technique can also be employed in methods subsequently discussed.

FIGS. 9–10 of the drawings show a modified C-frame motor manufacturing method and apparatus for forming the C-frame motors illustrated in FIGS. 11A–11D of the drawings. The C-frame motors illustrated in FIGS. 11A–11D of the drawings are similar to the motor 1 illustrated in FIGS. 8A–8D of the drawings with the exception that the smaller stack height motor 11C does not have a full circular cross sectional configuration, but rather has a generally circular outer cross sectional shape at least along opposed spaced sections thereof. This is due to the fact that the manufacturing method and apparatus shown in FIGS. 9–10 of the drawings does not produce extra laminations for the winding coil laminations 53, as in the FIGS. 1–7 disclosed method and apparatus.

As in the FIGS. 1–7 method and apparatus, the method and apparatus of FIGS. 9–10 also forms two mirror image C-frame motor laminations and coil winding laminations simultaneously. Thus, a dotted line separates the left and right laminations from each other to assist in understanding the described method and apparatus.

As viewed from left to right in FIGS. 9–10, a successive series of die cutting steps takes place through various stages or stations in a progressive punching or stamping system. While the FIGS. 1–7 method and apparatus disclose two movable die sets D1 and D2 which move relative to the elongated strip 23, the method and apparatus shown in FIGS. 9–10 disclose three movable die sets D3, D4 and D5 each operated by computer or electronically controlled drive motors M3, M4 and M5, respectively.

As viewed from left to right in FIGS. 9–10, the first step in the method and apparatus of FIGS. 9–10 includes the forming of the rotor openings 45L and 45R which produce the stamped rotor laminations 47L, 47R, as illustrated. The spaced rotor openings 45L, 45R are formed within the confines of the spaced notches 65L, 65L for the left lamination 43L and right spaced notches 65R, 65R for the right lamination 43R.

Then, the computer or electronically controlled drive motor M3 operates the movable die set D3 to move it to the right in order to form the wide notch 67L on the left side of the left lamination 43L to produce the scrap piece 69L. The left side of the left lamination 43L forms the left side 53LL for the left coil winding lamination 53L.

The next movable die section D4 is moved by the computer or electronically controlled drive motor M4 to the left, as shown by the left arrow L, causing the wide notch 67R to be formed on the right side of the right lamination 43R, which also forms the right side 53RR of the coil winding lamination 53R subsequently to be formed by the movable die section D5. The wide notch 67R produces the scrap notch section 69R to the right side of the coil stock 63, as shown. At the same time, the left coil winding lamination 53L is formed, along with the complementary male and female fastening connections 59L, 59L and 61L, 61L in the left lamination 43L and winding coil lamination 53L, respectively.

The next movable die section D5 is operated by the computer electronically controlled drive motor M5 to the right as shown by the right arrow R for forming the right coil winding lamination 53R, in the same manner as left coil winding lamination 53L.

At the next die station, scrap pieces 71R and 71L, to the right and left side of the coil stock, are blanked from the right and left laminations 43R, 43L to form the U–shaped openings 49R, 49L respectively. At final stamping stations FSL and FSR, the left and right stator laminations 43L and 43R, respectively, are stamped from the coil stock 63 to provide the separate laminations.

As seen in both FIGS. 9–10, the width of the combined right and left side laminations 43R, 43L are reduced and increased in width due to the varying amount of material removed as the wide notches 67L, 67R and coil winding laminations 53R, 53L are increased and decreased for producing stair stepped or incremental differences of predetermined incrementally varying widths. This results in a predetermined number of coil winding laminations 43L or 43R for a corresponding number of stator laminations 43L or 43R which are arranged to be stacked as a predetermined combined coil winding area of generally circular outer cross sectional shape, at least along opposed spaced sections thereof. This is best illustrated in the C-frame motor illustrations of FIGS. 11A–11D. The motor shown in Figures lib and D have a generally circular outer cross sectional shape, while the coil winding laminations 53 in the FIG. 11C embodiment has a generally circular outer cross sectional shape, at least along opposed spaced sections thereof.

The method and apparatus shown in FIG. 12 differs from that shown in FIGS. 1–7 and 9–10 in that instead of forming separate C-frame laminations and coil winding laminations which are subsequently assembled to one another after an insulating bobbin with electrically conductive coil is mounted over the stacked coil winding lamination, a one-piece lamination is formed with an integral coil winding lamination. After a series of similarly formed one-piece laminations are stacked, a split insulating bobbin is positioned over the coil winding area and the electrically conductive coil is wound over the assembled split bobbin. This is best explained, for example, in my copending patent application Ser. No. 08/129,336 filed Sep. 30, 1993 entitled METHOD FOR MANUFACTURING IMPROVED ELECTRO-MAGNETIC INDUCTION DEVICES.

The FIG. 12 method forms 2 mirror image one-piece C-frame motor laminations which are separated from one another by the dotted line that extends down the center of the strip 62.

The method and apparatus for forming one-piece laminations as shown in FIG. 12 is somewhat similar to the method and apparatus illustrated in FIGS. 9–10 of the drawings. As viewed from left to right in FIG. 12, the first step includes the forming of rotor openings 44L and 44R in the strip 62 which produces the stamped rotor laminations 46L, 46R, as illustrated. The spaced rotor openings 44L and 44R are formed within the confines of spaced notches 64L, 64L and 64R, 64R for the left and right one-piece laminations 42L, 42R, respectively.

Computer or electronically controlled drive motor M6 operates the movable die set D6 to move it to the right, as shown by right arrow R, in order to form the wide notch 66L in the left side of the left lamination 42L to produce the scrap piece 68L.

The next movable die section D7 is moved by the computer or electronically controlled drive motor M7 to the left, as shown by left arrow L, to form the wide notch 66R on the right side of the right lamination 42R. The wide notch 66R produces the scrap piece 68R to the right side of the coil stock 62, as shown. At the same time, the rectangular opening 52L is formed in the left lamination 42L. This produces the rectangularly shaped scrap piece 54L to the left side of the coil stock 62.

The next movable die section D8 is moved by the computer or electronically controlled drive motor M8 to the right, as shown by right arrow R, for forming the rectangular opening 52R in the right lamination 42R producing the rectangularly shaped scrap piece 54R to the right of the coil stock 62.

At the next die station, rectangularly shaped scrap pieces 70R and 70L are blanked from the right and left laminations 42R, 42L to form the coil winding window 72R, 72L in the right and left laminations 42R, 42L, respectively.

It will be understood that the width of the integral coil winding are 74R, 74L are reduced and increased in width due to the varying amount of material removed as the wide notches 66R, 66L and rectangular openings 52R, 52L are increased anddecreased for producing stair stepped or incrementally varying widths. This results in a predetermined number of stacked laminations for each motor to be formed leaving a predetermined and combined coil winding area of generally circular outer cross sectional edge, at least along opposed spaced sections thereof.

As indicated above, split insulating bobbins will be assembled over each thus formed combined coil winding area in order to enable an electrically conductive wire to be wound about the assembled split bobbin, as described in copending patent application Ser. No. 08/129,336 identified above.

The FIG. 12 method and apparatus thus illustrates the forming of one-piece C-frame motor laminations in lieu of the separate C-frame and coil winding laminations formed by the method and apparatus illustrated in FIGS. 1–7 and 9–10. It will also be understood that similar one-piece laminations can be formed for the four pole motor shown in FIGS. 14–15 of the drawings, as well as for other motors that come within the purview of the present invention.

Reference is now made to the FIG. 13 manufacturing method and apparatus for forming the four pole motor shown in FIGS. 14–15 of the drawings. The motor 81 shown in Figures 14–15 of the drawings includes a series of stacked stator laminations 83, formed as illustrated, with a rotor opening 85 for receiving a rotor 87 that rotates with respect to a series of poles formed in the stator laminations 83 adjacent the rotor opening 85. The four slots 88 are for insertion of shading copper in the four pole motor illustrated in FIG. 14. The motor 81 includes a pair of U-shaped openings 89, 89 at opposite ends thereof for receiving the bobbins 91, 91 that are mounted on the stacked coil winding laminations 93, 93, each of which collectively have a combined generally circular outer cross sectional shape, as illustrated in FIG. 15, for receiving the center wall 95 of each bobbin 91. Wound about the insulating bobbin 91 is the electrically conductive wire 97 that is layer wound in closely packed relationship in a series of superimposed rows, as described in my aforementioned copending patent applications. The opposite ends of each of the stator laminations 83 include spaced male bosses 99, 99 for complementary cooperative fastening interconnection relative to spaced female openings 101, 101 at each end of the motor 81, as best seen in FIG. 13 of the drawings. Thus, the motor 81 is similar in certain respects to the C-frame motors illustrated in FIGS. 8A–8D and FIGS. 11A–11D, except that there are spaced and stacked coil winding laminations 93 attached to opposite ends of the stacked stator laminations 83, each of the stacked coil winding laminations 93 receiving a bobbin with an electrically wound coil 97. Of course, stacked one-piece laminations with spaced coil winding windows can each receive split insulating bobbins about which an electrically conductive wirecan be wound, if desired to be formed in this way.

For the manufacture of the four pole motor illustrated in FIGS. 14–15 of the drawings, reference is made to FIG. 13 which shows an elongated strip of magnetically conductive coil stock material 103 that is indexed through various work stations for progressively stamping various configurations in the coil stock 103, in a manner similar to the method described in connection with FIGS. 1–8 or 9–11 of the drawings. With respect to the FIG. 13 method, the coil stock 103 is initially stamped or punched with the rotor opening 85, resulting in the rotor slug or lamination 87 that forms the rotor 87 when a series of corresponding slugs or laminations are stacked together. Spaced notches 109L, 109L to the left and 109R, 109R to the right of the coil stock 103 are formed in alignment with pointed triangular ends of the rectangular slot with triangular ends 105 that is punched in the coil stock 103 to thus define each stator lamination 83 to be formed. Scrap 111L, 111R comes from the notches 109L, 109R while scrap piece 107 comes from the rectangular slot with triangular ends 105.

The next step in the progressive stamping or punching system includes movement by the movable die D9, which is moved to the right as shown by right arrow R. This movement to the right is produced by the computer or electronically controlled drive motor M9 for forming a trapezoidal opening 110R, producing trapezoidal scrap piece 112R. The right side of the trapezoidal opening 110R forms the left side 93RL of the coil winding lamination 93R. At the same time, the wide notch 114L is formed on the left side of the lamination 83 which forms the left side 93LL for the left coil winding lamination 93L. Notch section 116L is produced during the forming of wide notch 114L.

The next movable die section D10 is moved by the computer or electronically controlled drive motor D10 to the left, as shown by the left arrow L, causing the wide notch 114R to be formed to the right side of the lamination 83, which forms the right side of the lamination 83, which forms the right side 93RR of the coil winding lamination 93R. The wide notch 114R produces the scrap notch section 116R to the right side of the coil stock 103, as shown. At the same time, a trapezoidal opening 110L is formed in the left side of the lamination 83, the longer side of the trapezoid which forms the right side 93LR of the left coil winding lamination 93L.

The next die section blanks out the right and left coil winding laminations 93R, 93L, respectively, as well as blanking out the three sides of the U-shaped opening 89 on the left and right sides of the U-shaped opening 89 on the left and right sides of the lamination 83.

Reference is made to FIGS. 4–7 for the various methods that may be employed in producing the coil winding laminations 93R, 93L and the scrap sections 118R, 118L. As will be appreciated, either one of the methods shown in FIGS. 4–5 or 6–7 may be employed, as desired.

In the forming of the right coil winding laminations 93R, spaced openings 101R, 101R are formed in the right coil winding laminations 93R while corresponding male bosses 99R, 99R are formed in the right side of the lamination 83. Similarly, spaced openings 101L, 101L are formed in the left coil winding lamination 93L with corresponding bosses 99L, 99L formed in the left side of lamination 83.

Each computer or electronically controlled drive motor M6, M7 is programmed to produce the coil winding laminations 93 with predetermined incrementally varying widths such that when stacked, the combined configuration of the stacked coil winding laminations 93 have a generally circular outer cross section shape, at least along opposed sections thereof, as illustrated in FIGS. 14–15 of the drawings. Following the stacking of the stator laminations 83 and the coil winding laminations 93 as described above and the assembly of same relative to the insulating bobbin 91 with wound electrically conductive coil 97 on each of the stacked coil winding laminations 93, 93 at opposite ends of the stacked stator laminations 83, the four pole motor 81 results.

In each of the methods and apparatus described in connection with FIGS. 1–7, 9–10 and 13 of the drawings, the stamping or punching dies are moved transversely relative to the elongated strip. In the discussion that follows with respect to FIGS. 16–34 of the drawings, it will be seen that punching or stamping dies can be moved not only transversely relative to the elongated strip, but also longitudinally relative to the strip as well as in rotary paths relative to the strip, depending on the construction of the motor desired to be manufactured. It is to be understood that the punching dies can be moved in any direction in linear and/or curvilinear paths relative to the step. This can be achieved by using one or more movable dies in combination with one another. For example, a rotary die could be mounted on top of a transversely movable section for a predetermined compound movement in a part linear and part curvilinear path or in any other path desired.

FIGS. 16–19 disclose the method and apparatus for forming the variable reluctance motor illustrated in Figures 20–22 of the drawings. The variable reluctance motor 121 shown in FIGS. 20–22 of the drawings is a multi-pole stator and rotor motor. The stacked stator laminations 123 form a series of inwardly directed poles 125 spaced around a rotor 127 also provided with a series of spaced poles 129. Each stator pole 125 has spaced stator pole side sections on opposite sides of an inwardly curved stator pole face section. Each rotor pole 129 has spaced rotor pole side sections on opposite sides of an outwardly curved rotor pole face section. In the FIGS. 20–22 illustrated embodiment, there are six stator poles 125 and four rotor poles 129. As will be appreciated, each of the inwardly directed stator poles 125 are formed by a series of stacked laminations 123 having predetermined incrementally varying widths forming each lamination 123 to form a combined configuration of the stacked stator laminations 123 that results in a combined generally circular outer cross sectional configuration of generally circular shape at least along opposed spaced sections thereof, as illustrated in FIG. 21 of the drawings. The top plan view of FIG. 20 illustrates approximately one-half of the rotor 127 and the four spaced poles 129, in order to show the predetermined incrementally varying widths of the poles 129 when a series of rotor laminations 127 are stacked upon one another to form the rotor 127. The actual cross sectional configuration of each pole 129 is illustrated in FIG. 22 of the drawings; however, in order to understand the manner in which each of the poles 129 of the rotor 127 are constructed, as seen in the top plan view of FIG. 20, only one-half of the rotor 127 and associated poles 129 are shown. For a more detailed discussion and specific description of variable reluctance motors, reference is made to my aforementioned copending patent application Ser. No. 08/173,095 filed Dec. 27, 1993 entitled VARIABLE RELUCTANCE MOTOR.

The method and apparatus for forming the variable reluctance motor 121 shown in FIGS. 20–22 can best be understood by reference to FIGS. 16–19 of the drawings. As will be seen in describing the method and apparatus associated with FIGS. 16–19 of the drawings, rotary stamping dies, longitudinal stamping dies and transverse stamping dies are utilized for forming rotor laminations 127 and the stator laminations 123. Rotary stamping dies are first utilized to form the rotor laminations 127 followed by longitudinal stamping dies and transverse stamping dies in forming the stator laminations 123.

The coil stock 133 is first punched at the punching station 135 with a series of four spaced rounded trapezoidal shaped slots 137, as best seen in FIGS. 18–19 of the drawings. The coil stock 133 is then fed to a pair of adjacent rotary stamping dies 139, 141 which enlarged the rounded trapezoidal shaped slots 137, first to the left and then to the right, as best understood by comparing FIG. 16 with the enlarged diagrammatic illustration shown in FIG. 19. As the rotary stamping die 139 rotates to the left, it is then moved relative to the coil stock 133 for forming enlarged portions 137L in each of the rounded trapezoidal shaped openings 137. The coil stock 133 is next indexed to the rotary stamping station 141 where the rotary stamping dies 141 are rotated to the right for forming the enlarged portions 137R in each of the trapezoidal shaped rounded openings 137 that have already been enlarged by the rotary stamping dies 139 on the left with enlarged portions 137L. The rotary stamping dies 139, 141 are programmed to rotate in predetermined incrementally varying arcs to form the shape of the rotor poles 129 previously discussed when a series of rotor laminations 127 are stacked relative to one another.

In the next progressive stamping or punching station 143, the rotor lamination 127 is punched from the coil stock 133, and at the same time, notches 145 are formed in opposite edges of the coil stock 133 resulting in scrap sections 147, 147 on opposite sides of the coil stock 133. The area within the confines of each pair of spaced notches 145, 145 on opposite edges of the coil stock define the stator lamination 123 which is also provided with an initially formed rotor opening 149, once the rotor lamination 127 is punched from the coil stock.

At the next two progressive die stations, longitudinally movable stamping dies 151, 153 are provided and are driven by any suitable means such as computer controlled stepper motors (not shown) for moving the dies 151, 153 in opposite longitudinal directions relative to the coil stock 133. The longitudinally movable stamping die 151 is moved to the right away from the rotary stamping stations 139, 141 for forming intersecting slots 155, 155 which intersect the rotor opening 149. The next longitudinally movable die 153, which moves longitudinally toward the rotary stamping dies 139, 141, forms a second pair of slots 157, 157 which also intersect the rotor opening 149 on an opposite side thereof from the spaced slots 155, 155. As will be seen, both pairs of slots 155, 155 and 157, 157 extend generally transversely to the outer free edges of each stator lamination 123 to be formed.

The next progressive stamping station 159 forms a vertical punching or stamping operation solely. Specifically, station 159 forms a longitudinally directed slot 158 that intersects the transversely extending slot 155 on each side of the rotor opening 149 as well as a longitudinally extending slot 61 that intersects the transversely extending slot 157 on each side of the rotor opening 149, thus resulting in opposed mirror image L-shaped slots 155, 158 and 155, 158 on the left side of the rotor opening 149 and mirror image L-shaped slots 157, 161 and 157, 161 on the right side of the rotor opening, as best illustrated in FIGS. 18 of the drawings. In addition, a pair of spaced mirror image axe-head shaped openings 163, 163 are formed so as to also intersect the rotor opening 149 in equally spaced relationship to each of the mirror image L-shaped openings on each side of the rotor opening 149.

The next step in the progressive stamping process or system includes shifting of the movable die set 165 to the left of the coil strip followed by shifting of the movable die set 167 to the right of the coil strip. The movable die set 165 moves transversely relative to the coil stock 133 and forms the previously formed L-shaped openings 155, 158 and 157, 161 on the left side of the coil stock into the fan blade shaped openings 169, 169 while the axe-head shaped openings 163, 163 are enlarged along the lower extent thereof. Subsequently, the transversely movable die set 167 moves to the right to form the L-shaped openings 155, 158 and 157, 161 into the spaced fan blade openings 171, 171. At the same time, the spaced axe-head shaped openings 163, 163 are enlarged at an upper end thereof into the configuration best illustrated in FIG. 18 of the drawings.

The last step in the process is the separation of each individual lamination 123 from the coil stock at the vertical punching or stamping station 173 to result in the individual laminations 123.

As will be appreciated, the longitudinally movable die sets 151, 153 and the transversely movable die sets 165, 167 are programmed to stamp or punch predetermined incrementally varying widths in the various openings discussed above, in order that the stator laminations 123, when stacked, produce combined generally circular outer cross sectional shaped spaced stator poles 125, as best seen in FIGS. 20–21 of the drawings, in a manner similar to the previously discussed motor constructions as well as my prior copending patent applications. Thus, it will be seen that the method and apparatus of FIGS. 16–19 forms the variable reluctance motor shown in FIGS. 20–22 through the use of rotary stamping dies, longitudinally movable stamping dies, and transversely movable stamping dies, all as discussed above.

The method and apparatus of FIG. 23 is useful for forming the six pole motor illustrated in FIG. 24. Additionally, a similar method may be employed for manufacturing the variable reluctance motor examples shown in FIGS. 25 and 26 of the drawings.

The six pole motor 181 shown in FIG. 24 includes a stator lamination 183 having a series of semi-cylindrical pole faces 185 and associated coil winding areas 187 which are constructed to include the combined generally circular outer cross sectional shape when a series of stacked stator laminations 183 are stacked together. The rotor 189 is positioned within the confines of the semi-cylindrical pole faces 185 as shown in FIG. 23.

The variable reluctance motor 191 shown in FIG. 25 has a construction similar to the six pole motor 181 shown in Figure 123 with the exception that there are a pair of spaced poles 195, 195 associated with each coil winding area 197 and the rotor has a series of spaced poles 199 moving within the confines of the spaced pairs of poles 195, 195 of the stacked stator laminations 193. Note that there are twelve stator poles 195 and ten rotor poles 199 to provide the multi-pole rotor/stator or variable reluctance motor illustrated in FIG. 25. FIG. 26 shows another form of variable reluctance motor 201 having a series of stacked laminations 203 with six poles 205 associated with each coil winding area 207. Since there are six coil winding areas 207, there are a total of 36 stator poles 205. The rotor has 38 rotor poles 209 rotating within the stator poles 205 in the construction illustrated. Other examples of variable reluctance motors are shown in my aforementioned copending patent application 08/173,095 filed Dec. 27, 1993 entitled VARIABLE RELUCTANCE MOTOR.

The six pole motor shown in FIG. 24 and the examples of variable reluctance motors shown in FIGS. 25 and 26 can be formed using rotary stamping dies such as that described in connection with FIG. 23 which refers specifically to the six pole motor construction shown in FIG. 24. Quite obviously, variations in the shape of the dies would be required for manufacturing the variable reluctance motor shown in FIGS. 25 and FIG. 26; however, the same essential procedural steps and apparatus would be employed.

In FIG. 23, the coil stock 213 is punched or stamped at the first progressive die station 215 to form the general configuration of the stator lamination 183 with the stator lamination and rotor 189 still integrally connected to one another, as illustrated. The next two progressive die stations 217 and 219 utilize rotary stamping dies, such as described in connection with FIGS. 16–19, for stamping the coil winding areas 187, first to the right, as shown in rotary die station 217 and then to the left as shown in rotary die station 219. This will produce a series of coil winding area 187 with predetermined incrementally varying widths to provide the generally circular outer cross sectional shape for the combined and stacked coil winding area 187, as illustrated in FIG. 24 of the drawings. Finally, at vertical die stamping or punching station 221, the stator 183 is stamped from the coil stock 213 along with the rotor 189 which is separated from the poles 185 of the stator lamination 183, in order to provide separate stator laminations 183 and rotor laminations 189 for stacking together to form the stacked motor stator laminations 183 and rotor 189, as illustrated in FIG. 24 of the drawings.

Similar method and apparatus would be employed for manufacturing the variable reluctance motors shown in FIGS. 25 and 26 of the drawings, with the exception that the stamping dies would be different for the spaced poles 195, 195 associated with each coil winding area 197 and the rotor poles 199 in the Figure 25 embodiment, as well as different stator pole 205 and rotor poles 209 in the FIG. 26 embodiment.

It will be appreciated that in each of the constructions illustrated in FIGS. 24, 25 and 26 of the drawings, a winding coil would be wound about the winding area either directly on the coil winding area or wound about a split insulating bobbin that is first assembled on each coil winding area in the same manner as described above and in my prior, copending patent applications, as indicated.

Attention is now directed to the method shown in Figure 27 for forming the inside-out motor illustrated in FIG. 28 of the drawings. The inside-out motor 231 includes a stator plate 233 having an inner circumferential series of spaced winding windows or openings 235 surrounded by an outer circumferential series of winding windows or openings 237. Between adjacent winding windows 235 in the inner circumferential series are coil winding segments 239, while coil winding segments 241 are located between adjacent winding windows 237 in the outer circumferential series. It will be appreciated that an electrically conductive wire is typically wound directly about the coil winding segments 39 in the inner circumferential series and coil winding segments 41 in the outer circumferential series.

The method and apparatus for forming the inside-out motor 231 shown in FIG. 28 is illustrated in FIG. 27 of the drawings. Coil stock 243 is fed to a first vertical stamping or die punching station which punches the spaced winding windows 235 and 237, respectively. The next two die stations are rotary stamping or punching dies 247 and 249 which first stamp an enlarged winding windows 235, 237 on the right, and then on the left, as illustrated. This will provide a circumferential series of inner coil winding segments 239 and an outer circumferential series of coil winding segments 241 with predetermined incrementally varying widths in order to provide a generally circular outer cross sectional shape at least along opposed spaced sections thereof for winding electrically conductive wire directly on the coil winding segments in a manner similar to the previous embodiments. Finally, in die stamping station 259, the stator plate 233 is stamped from the coil stock along with an outer rotor ring 253, shown in dotted lines in both FIGS. 27 and 28 of the drawings. The outer rotor ring 253 is designed to rotate relative to the stator plate 233, in a manner well known in the art.

It will be understood that certain motors can be formed simply by the use of forming elements or dies that are incrementally moved predetermined amounts in a linear path by computer or electronically controlled drive motors to form a series of laminations that are identical in shape except for coil winding areas. In those coil winding areas, adjacent laminations vary in order to provide coil winding areas of generally circular outer cross sectional configuration at least along spaced opposed sections thereof. For example, the two types of universal motors shown in FIG. 29 and FIG. 30 are produced in this way. The specific construction of the FIG. 29 and FIG. 30 motors, as well as the difference between adjacent laminations in the forming process, are described in greater detail in the aforementioned copending U.S. Ser. No. 08/129,336 filed Sep. 30, 1993 entitled METHOD FOR MANUFACTURING IMPROVED ELECTRO-MAGNETIC INDUCTION DEVICES.

In the same way, the four pole motor shown in FIG. 31 and the six pole motor shown in FIG. 32 are similarly formed. Also, the variable reluctance motors illustrated in FIG. 33 and FIG. 34 can be formed in the similar manner. The construction and the method of manufacture of the FIGS. 33 and 34 variable reluctance motors can be further understood by the reference to aforementioned copending U.S. Ser. No. 08/173,095 filed Dec. 27, 1993 entitled VARIABLE RELUCTANCE MOTOR.

The above examples are simply representative of various other types and kinds of motors that can be manufactured by the method and apparatus of the present invention. In addition to the motor examples specifically disclosed in this application as well as the aforementioned copending patent applications, it will be appreciated that other types and kinds of motors, as well as transformers and inductors, can be produced by the apparatus and method of the present invention.

In all of the prior embodiments specifically disclosed in the present invention, the electro-magnetic induction devices were illustrated as motors; however, it will be recognized that transformers and other inductors can be formed by the methods discussed above. In addition, the previously discussed embodiments have referred to computer or electronically controlled drive motors as one type of device for providing the desired movement of the transverse or longitudinally moving dies or rotary moving dies relative to an elongated strip. Other types of devices are, of course, possible including the use of a press stroked index cam such as shown in FIGS. 35–36 of the drawings.

The press stroked index cam 255 functions to transversely move the die sets 257 and 259 relative to the coil stock 263. FIG. 35 also shows the formation of E–I transformers from the coil stock 263. In the first vertically moving stamping or punching station 265, an opposed pair of spaced windows 267, 269 is formed in the coil stock 263. This produces a pair of I-shaped laminations. Then, transversely moving die sets 257, 259 punch or stamp the area between the spaced elongated windows 267, 269 with predetermined incrementally varying widths. Finally, at vertical die stamping or punching station 271, the coil stock is further stamped into two E-shaped laminations 273, 273. Two E-shaped laminations will be formed from each pair of winding windows 267, 269, as is explained in further detail in my aforementioned copending patent application Ser. No. 08/197,255 filed Feb. 16, 1994 entitled LOW COST TRANSFORMER/INDUCTOR AND METHOD OF MANUFACTURE, now abandoned. It will be understood; however, that the intermediate or middle leg of each E-shaped lamination will have a predetermined incremental varying width such that when a plurality of E-shaped laminations 273 are stacked, the combined configuration will have a generally circular outer cross sectional shape at least along opposed spaced sections thereof, in order to accommodate an efficiently and compactly wound electrically conductive coil with less material than the square or rectangularly shaped winding areas of the prior art.

In all of the previous embodiments discussed in connection with FIGS. 1–36 of the drawings, the punching or stamping dies have been moved transversely and/or longitudinally and/or in a rotary fashion relative to the elongated coil stock strip. The present invention also contemplates moving the elongated strip relative to the punching or stamping dies. This is illustrated in FIGS. 37–39 of the drawings.

In FIG. 37, coil stock 283 is fed through a series of progressive die stamping stations 285, 287 and 289 for forming transformers from the coil stock.. It will be noted that there are looped areas of the coil stock 283 between each of the various progressive die stamping stations 285, 287 and 287, 289. This enables computer or electronically controlled strip feed mechanism 291 and 293, as shown in FIG. 38, to longitudinally feed the elongated strip 283 in precise incremental movement relative to the stamping stations 287 and 289 respectively. Similarly, in FIG. 39 of the drawings, the computer or electronically controlled strip feed mechanisms 295 and 297 will move the elongated strip 283 transversely relative to the die stamping stations 287 and 289 for the precise incremental stamping that is desired. Suitable means (not shown) are employed for moving the elongated strip 283 and computer or electronically controlled feed mechanism 291 and 293 in FIG. 38 and 295 and 297 in FIG. 39, as will be apparent.

From the foregoing, it will now be appreciated that the present invention has disclosed a unique method and apparatus in which predetermined incrementally varying widths used in coil winding segments of laminations for electro-magnetic induction devices are formed by moving punching or stamping dies relative to magnetically conductive material or by moving the magnetically conductive material relative to punching or stamping dies. When the punching or stamping dies are moved relative to magnetically conductive material, they can be moved in any direction in any linear and/or curvilinear path. For example, they can be generally transversely, generally longitudinally, in a rotary fashion or in any other predetermined format relative to the magnetically conductive material to produce the desired lamination construction. When moving the magnetically conductive material relative to punching or stamping dies, the magnetically conductive material is moved generally transversely or generally longitudinally or in any other desired predetermined path relative to the magnetically conductive material. The novel method and apparatus thus provides continuous operation and automation in the forming and subsequent stacking of variable laminations which can also be readily adapted to current manufacturing techniques, as well as current electro-magnetic induction device constructions, without requiring substantial modifications or changes.

In view of the above, it will be seen that the several objects and features of this invention are achieved and other advantageous results obtained.

As various changes could be made in the above construction and methods without departing from the scope of the invention, it is intended that all matter contained in the above description or shown in the accompanying drawings shall be interpreted as illustrative and not in a limiting sense.

I claim:

1. The method of forming and stacking laminations for C-frame motors comprising:

forming a series of C-frame laminations from magnetically conductive coil stock, each C-frame lamination being formed with a rotor opening adjacent one end and a U-shaped opening adjacent an opposite end;

progressively forming a series of separate coil winding laminations from the magnetically conductive coil stock adjacent to said C-frame laminations during the forming of said C-frame laminations, said coil winding laminations being formed with predetermined incrementally varying width;

stacking a predetermined number of said C-frame laminations with the rotor openings and U-shaped openings thereof in vertical alignment with corresponding openings of adjacent laminations;

stacking said coil winding laminations in a predetermined sequence to provide a stacked coil winding area of generally circular cross sectional shape at least along opposed spaced sections thereof;

whereby an electrically conductive wire of predetermined length can be positioned about the coil winding area of generally circular outer cross sectional shape prior to the mounting of the stacked coil winding laminations relative to the aligned U-shaped openings of said stacked C-frame laminations.

2. The method of forming and stacking laminations for C-frame motors comprising:

progressively forming a series of mirror image C-frame laminations from magnetically conductive coil stock including the forming of opposite edge portions of said C-frame laminations in predetermined incrementally varying dimensions;

progressively forming predetermined incrementally varying width coil winding laminations from said C-frame laminations including said opposite edge portions during the forming of said C-frame laminations to provide coil winding laminations of predetermined incrementally varying widths;

stacking a series of C-frame laminations in aligned and superimposed relationship to one another; and stacking a corresponding number of coil winding laminations also in aligned and superimposed relationship to one another to form a predetermined stacked coil winding area of generally circular cross sectional shape at least along opposed spaced sections thereof for receiving an electrical coil of corresponding shape; and assembling the stacked C-frame laminations and stacked coil winding laminations to one another.

3. The method as defined in claim 2 including the sequential forming of opposite edge portions of said C-frame laminations in predetermined incrementally varying dimensions.

4. The method as defined in claim 3 including the forming of complementary fastening elements on said C-frame laminations and coil winding laminations for assembly to one another.

5. The method as defined in claim 4 including the forming of said complementary fastening elements on said C-frame laminations and coil winding laminations during the forming of said coil winding laminations from said C-frame laminations.

6. The method as defined in claim 5 including the forming of a U-shaped opening in said C-shaped laminations adjacent the assembled position of said coil winding laminations to said C-frame laminations for receiving the electrical coil positioned about the combined coil winding area of stacked coil winding laminations.

7. The method as defined in claim 6 wherein the U-shaped opening is formed in said C-shaped laminations during the forming of said coil winding laminations.

8. The method as defined in claim 6 wherein the U-shaped opening is formed in said C-shaped laminations after the stamping of said coil winding laminations.

9. The method of forming and stacking laminations for a multi-pole motor comprising:

progressively stamping a plurality of stator laminations from magnetic conductive coil stock including a rotor opening for each lamination;

progressively stamping predetermined incrementally varying width coil winding laminations from opposite end areas of said stator laminations to provide two coil winding laminations each having predetermined incrementally varying widths;

stacking the plurality of stator laminations in aligned and superimposed relationship to one another;

stacking a corresponding number of said two spaced coil winding laminations also in aligned and superimposed relationship to one another to form two spaced predetermined stacked coil winding areas of generally circular cross sectional configuration at least along opposed spaced sections thereof each for receiving an electrical coil of corresponding shape; and assembling the stacked stator lamination to the two spaced and stacked coil winding laminations.

10. The method as defined in claim 9 including the forming of complementary fastening elements on said stator laminations and said two spaced coil winding laminations for assembly of said rotor laminations to said two spaced coil winding laminations.

11. The method as defined in claim 10 including the forming of said complementary fastening elements on said stator laminations and said two spaced coil winding laminations during the forming of said coil winding laminations from said rotor laminations.

12. The method as defined in claim 11 including the forming of a U-shaped opening on opposite ends of said stator laminations adjacent the assembled position of said two stacked coil winding lamination to said stator laminations for receiving an electrical coil positioned about the combined coil winding area of each said stacked coil winding laminations.

13. The method as defined in claim 12 wherein each U-shaped opening is formed in said stator lamination after the stamping of said coil winding laminations.

14. The method of forming and stacking laminations for inside out motors, comprising:

incrementally forming from magnetically conductive coil stock a plurality of laminations each having at least one circumferential series of coil winding segments, each coil winding segment of said circumferential series of coil winding segments being formed with predetermined incrementally varying widths similar to other coil winding segments in the circumferential series; and stacking said laminations with the coil winding segments forming a stacked generally circular cross sectional winding area about which a predetermined length of electrically conductive wire can be positioned.

15. The method as defined in claim 14 including the forming of each lamination with coil winding segments of predetermined incrementally varying widths by curvilinear forming elements that move in predetermined curvilinear paths relative to said coil stock.

* * * * *